US012543230B2

(12) United States Patent
Yi et al.

(10) Patent No.: US 12,543,230 B2
(45) Date of Patent: Feb. 3, 2026

(54) METHOD FOR IMPLEMENTING WI-FI PEER-TO-PEER SERVICE AND RELATED DEVICE

(71) Applicant: Huawei Technologies Co., Ltd., Shenzhen (CN)

(72) Inventors: Li Yi, Shenzhen (CN); Kexiong Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 497 days.

(21) Appl. No.: 17/976,256

(22) Filed: Oct. 28, 2022

(65) Prior Publication Data
US 2023/0069398 A1 Mar. 2, 2023

Related U.S. Application Data

(63) Continuation of application No. PCT/CN2021/089661, filed on Apr. 25, 2021.

(30) Foreign Application Priority Data

Apr. 30, 2020 (CN) .......................... 202010365426.2

(51) Int. Cl.
H04W 76/14 (2018.01)
H04W 72/04 (2023.01)
(Continued)

(52) U.S. Cl.
CPC ........... *H04W 76/14* (2018.02); *H04W 72/04* (2013.01); *H04W 74/0808* (2013.01); *H04W 84/12* (2013.01)

(58) Field of Classification Search
CPC .... H04L 1/1812; H04L 5/0055; H04W 12/03; H04W 36/0011; H04W 72/02;
(Continued)

(56) References Cited

U.S. PATENT DOCUMENTS

RE43,127 E * 1/2012 Wentink ................ H04W 92/18
370/338
10,098,166 B2 10/2018 Xin et al.
(Continued)

FOREIGN PATENT DOCUMENTS

CN 101313527 A 11/2008
CN 100502553 C 6/2009
(Continued)

OTHER PUBLICATIONS

Yoon et al., "Peer-assisted video-on-demand in multi-channel switching WiFi-based mobile networks," Proceedings of the 2012 Asia Pacific Signal and Information Processing Association Annual Summit and Conference, Hollywood, CA, USA, 2012, pp. 1-7. (Year: 2012).*
(Continued)

Primary Examiner — Thomas R Cairns
(74) Attorney, Agent, or Firm — Slater Matsil, LLP

(57) ABSTRACT

This application discloses a method for implementing a Wi-Fi peer-to-peer service and a related device. The method may be applied to the field of Wi-Fi communication. The method includes: A first device sends a first action frame to a second device through a first channel, where the first action frame carries a channel switching parameter. Then, both the first device and the second device switch to a same channel indicated by the channel switching parameter to perform Wi-Fi peer-to-peer service communication.

18 Claims, 15 Drawing Sheets

(51) Int. Cl.
*H04W 74/0808* (2024.01)
*H04W 84/12* (2009.01)

(58) Field of Classification Search
CPC ............ H04W 72/04; H04W 72/0446; H04W 72/0453; H04W 72/56; H04W 74/0808; H04W 74/0816; H04W 76/04; H04W 76/14; H04W 76/23; H04W 84/12; H04W 84/18; H04W 92/18; H04W 5674/0808; H04W 5674/0816; H04W 36/0055; H04W 72/11; H04W 72/115; H04W 72/40; H04W 72/566
See application file for complete search history.

(56) References Cited

U.S. PATENT DOCUMENTS

| | | |
|---|---|---|
| 2008/0240023 A1 | 10/2008 | Trainin |
| 2013/0165134 A1* | 6/2013 | Touag .................. H04W 16/14 455/452.1 |
| 2015/0319235 A1 | 11/2015 | Liu et al. |
| 2015/0351018 A1* | 12/2015 | Kim ..................... H04W 48/16 370/338 |
| 2016/0044705 A1 | 2/2016 | Gao et al. |
| 2017/0251372 A1 | 8/2017 | Belghoul et al. |
| 2017/0303280 A1* | 10/2017 | Chun .................. H04L 5/0094 |
| 2019/0297545 A1 | 9/2019 | Ramachandra et al. |
| 2019/0357214 A1* | 11/2019 | Kurian .................. H04W 16/04 |
| 2020/0214059 A1* | 7/2020 | Suzuki ................. H04W 76/14 |
| 2023/0363001 A1* | 11/2023 | Guo ...................... H04L 5/0058 |

FOREIGN PATENT DOCUMENTS

| | | | |
|---|---|---|---|
| CN | 104704906 A | | 6/2015 |
| CN | 104770021 A | | 7/2015 |
| CN | 108243484 A | | 7/2018 |
| CN | 108471630 A | | 8/2018 |
| CN | 108476455 A | | 8/2018 |
| CN | 109743712 A | | 5/2019 |
| CN | 111641979 A | | 9/2020 |
| EP | 3041161 A2 | | 7/2016 |
| JP | 2016106503 A | | 6/2016 |
| KR | 20140019029 A | | 2/2014 |
| KR | 20140118896 A | * | 10/2014 |
| KR | 20160001414 A | * | 1/2016 |
| WO | 2012061504 A2 | | 5/2012 |
| WO | WO-2022052046 A1 | * | 3/2022 |

OTHER PUBLICATIONS

Kwon et al., "Method for Direct Communication Between Stations in Wireless Local Area System," English machine translation of KR-20140118896-A, Clarivate Analytics, pp. 1-14 (Year: 2025).*
Park et al., "Method for Managing Power of Dual Band AP," English machine translation of KR-20160001414-A, Clarivate Analytics, pp. 1-14 (Year: 2025).*
Charter et al., "Clarification on LAA channel access for multi-carrier operation and channel bonding supersets", 3GPP TSG-RAN4 Meeting #89, R4-1815333, Spokane, WA, Nov. 12-16, 2018, 7 pages.
Orfanos, G. et al., "An Adaptive MAC Protocol for MC-CDMA Adhoc Wireless LAN", 2005 IEEE 16th International Symposium on Personal, Indoor and Mobile Radio Communications (PIMRC), vol. 4, Berlin, Germany, Sep. 11-14, 2005, pp. 2734-2741.
IEEE Std 802.11b-1999 (R2003) (Supplement to ANSI/IEEE Std 802.11, 1999 Edition), Supplement to IEEE Standard for Information technology; Telecommunications and information exchange between systems; Local and metropolitan area networks; Specific requirements; Part 11: Wireless LAN Medium Access Control (MAC) and Physical Layer (PHY) specifications: Higher-Speed Physical Layer Extension in the 2.4 GHz Band, IEEE Computer Society, Sponsored by the LAN/MAN Standards Committee, Reaffirmation Jun. 12, 2003, 96 pages.
IEEE Std 802.11g™-2003 (Amendment to IEEE Std 802.11™, 1999 Edition (Reaff 2003), IEEE Standard for Information technology; Telecommunications and information exchange between systems; Local and metropolitan area networks; Specific requirements; Part 11: Wireless LAN Medium Access Control (MAC) and Physical Layer (PHY) specifications; Amendment 4: Further Higher Data Rate Extension in the 2.4 GHz Band, IEEE Computer Society, Sponsored by the LAN/MAN Standards Committee, Jun. 27, 2003, 78 pages.
IEEE Std 802.11™-2012; IEEE Standard for Information technology; Telecommunications and information exchange between systems Local and metropolitan area networks; Specific requirements; Part 11: Wireless LAN Medium Access Control (MAC) and Physical Layer (PHY) Specifications, IEEE Computer Society, Sponsored by the LAN/MAN Standards Committee, Mar. 29, 2012, 2793 pages.
Christos Chousidis, "Wireless Audio Networking Modifying the IEEE 802.11 standard to handle muiti-channel, real-time wireless audio networks" Brunel University, Aug. 2014, total 155 pages.

* cited by examiner

| Quantity of bytes | 2 | 2 | 6 | 6 | 6 | 2 | 1 | 1 | Variable length | 4 |
|---|---|---|---|---|---|---|---|---|---|---|
| | Frame control (Frame Control) | Duration (Duration) | DA | SA | BSS ID | Sequence control (Seq-ctl) | Category field (Category) | Action frame (Action) | Element (Elements) | Frame check sequence (FCS) |
| | MAC frame header (MAC header) | | | | | | | Action frame details (Action details) | | |

METHOD FOR IMPLEMENTING WI-FI PEER-TO-PEER SERVICE AND RELATED DEVICE

CROSS-REFERENCE TO RELATED APPLICATIONS

This application is a continuation of International Application No. PCT/CN2021/089661, filed on Apr. 25, 2021, which claims priority to Chinese Patent Application No. 202010365426.2, filed on Apr. 30, 2020. The disclosures of the aforementioned applications are hereby incorporated by reference in their entireties.

TECHNICAL FIELD

This application relates to the field of Wi-Fi communications technologies, and in particular, to a method for implementing a Wi-Fi peer-to-peer service and a related device.

BACKGROUND

Wi-Fi peer-to-peer (Wi-Fi P2P) is a technology that supports peer-to-peer communication between Wi-Fi devices in the field of Wi-Fi communications technologies. After two or more Wi-Fi devices are connected by using the Wi-Fi P2P technology, a small-range network architecture (P2P Network, also referred to as a P2P Group) may be formed, and mutual communication may be implemented without an access point (AP). For example, the Wi-Fi P2P technology may be used to implement mirroring projection from a mobile phone to a smart television, file transmission between mobile phones, or control of a smart home appliance by a mobile phone.

Generally, when two devices establish a connection by using Wi-Fi P2P for the first time, because one device cannot predict a channel used by the other device, the two devices need to simultaneously perform channel scanning (for example, scan a channel 1/6/11). Channel scanning usually takes a long time. How to improve efficiency of establishing a peer-to-peer service is an urgent problem to be resolved by persons skilled in the art.

SUMMARY

This application provides a method for implementing a Wi-Fi peer-to-peer service, to improve efficiency of establishing a Wi-Fi peer-to-peer service.

According to a first aspect, this application provides a method for implementing a Wi-Fi peer-to-peer service. The method is applied to a Wi-Fi communications system, the Wi-Fi communications system includes a first device and a second device, and the method includes: The first device sends a first action frame to the second device through a first channel, where the first action frame carries a channel switching parameter, and the channel switching parameter includes one or a combination of the following: channel information of a second channel, switching mode information, and dual band adaptive concurrent DBAC mode information. The second device receives the first action frame, and switches to the second channel based on the channel switching parameter. The first device switches to the second channel based on the channel switching parameter. The first device performs Wi-Fi peer-to-peer service communication with the second device through the second channel. In this manner, efficiency of establishing Wi-Fi peer-to-peer service communication can be improved.

With reference to the first aspect, in a possible implementation, the Wi-Fi communications system further includes an access point AP, and the AP, the first device, and the second device communicate with each other through the first channel.

With reference to the first aspect, in a possible implementation, the channel switching parameter includes an immediate switching mode, and the immediate switching mode is used to indicate the second device to switch to the second channel in response to the first action frame.

With reference to the first aspect, in a possible implementation, the channel switching parameter includes a delayed switching mode and an extension time corresponding to the delayed switching mode, and the delayed switching mode and the extension time are used to indicate the second device to switch to the second channel after a delay of the extension time.

With reference to the first aspect, in a possible implementation, the channel switching parameter includes a permanent switching mode, and the permanent switching mode is used to indicate the second device to continuously listen to the second channel and the first channel. The method further includes: The first device sends a second action frame to the second device, where the second action frame is used to indicate the second device to switch back to the first channel. The second device receives the second action frame, and switches to the first channel based on the second action frame.

With reference to the first aspect, in a possible implementation, the channel switching parameter includes a fixed-duration switching mode and switching duration corresponding to the fixed-duration switching mode, and the fixed-duration switching mode and the switching duration are used to indicate the second device to switch back to the first channel after the switching duration starting from the switching to the second channel.

With reference to the first aspect, in a possible implementation, the channel switching parameter includes a DBAC slot allocation ratio and a scheduling periodicity, the DBAC slot allocation ratio is used to indicate a ratio of duration in which the second device listens to the first channel to duration in which the second device listens to the second channel in one scheduling periodicity, and the scheduling periodicity is used to indicate a sum of the duration for listening to the first channel and the duration for listening to the second channel that are consecutive. The method further includes: The second device listens to the first channel and the second channel based on the DBAC slot allocation ratio and the scheduling periodicity.

With reference to the first aspect, in a possible implementation, the channel information of the second channel includes a channel identifier and a frequency bandwidth of the second channel, and the frequency bandwidth is less than 20 MHz.

With reference to the first aspect, in a possible implementation, that the first device sends a first action frame to the second device through a first channel includes: The first device broadcasts the first action frame on the first channel. In a broadcast manner, the first action frame may be directly sent and received by all receiving devices on a channel sent by a terminal device, without waiting for RTS/CTS, so that efficiency of establishing Wi-Fi peer-to-peer service communication can be improved.

With reference to the first aspect, in a possible implementation, the channel switching parameter includes the channel identifier and the frequency bandwidth of the second channel, and the method further includes: The first device determines used communication channels in an environment in which the first device is currently located. The first device determines the channel identifier and the frequency bandwidth of the second channel based on the used communication channels, where there is no overlapping frequency band between the second channel and the used communication channels, or the second channel is an idlest channel in the used communication channels, or the second channel is a channel with best communication quality in the used communication channels. In this manner, communication quality of Wi-Fi peer-to-peer service communication can be improved.

With reference to the first aspect, in a possible implementation, the channel switching parameter includes the switching mode information and the DBAC mode information, the switching mode information includes a switching manner and/or switching duration for the second device to switch to the second channel, and the DBAC mode information includes the DBAC slot allocation ratio and/or the scheduling periodicity. The method further includes: The first device determines the switching mode information and the DBAC mode information based on a requirement of the Wi-Fi peer-to-peer service. In this manner, a communication requirement of the Wi-Fi peer-to-peer service can be met.

With reference to the first aspect, in a possible implementation, the first device prestores a key corresponding to the second device, and the first action frame is encrypted by using the key corresponding to the second device. In this manner, a problem that another receiving device performs a misoperation in response to the first action frame can be avoided.

With reference to the first aspect, in a possible implementation, after the second device receives the first action frame, the method further includes: The second device parses the first action frame based on the key corresponding to the second device, to determine the channel switching parameter. The second device sends an acknowledgement ACK to the first device, where the ACK is a response to the first action frame, and the ACK is used to indicate that the second device has successfully received and obtained the first action frame through parsing. The first device receives the ACK sent by the second device. That the first device switches to the second channel based on the channel switching parameter includes: The first device switches to the second channel based on the channel switching parameter and the ACK. In this manner, the first device can determine whether the second device successfully receives and obtains the first action frame through parsing, to improve reliability of implementing the Wi-Fi peer-to-peer service.

With reference to the first aspect, in a possible implementation, before the first device sends the first action frame to the second device through the first channel, the method further includes: The first device determines the used communication channels in the environment in which the first device is currently located. When the first device determines that there is a third channel, the first device sends a self-CTS packet through the third channel, where the third channel is one of the used communication channels, there is an overlapping frequency band between the third channel and the second channel, and the self-CTS packet is used to indicate a receiving device that receives the self-CTS packet to remain silent within a channel occupancy time declared by the self-CTS packet. In this manner, communication quality of the Wi-Fi peer-to-peer service can be improved.

With reference to the first aspect, in a possible implementation, before the first device sends the self-CTS packet through the third channel, the method further includes: The first device determines that the Wi-Fi peer-to-peer service is a high-priority service. Because sending of the self-CTS packet affects another communication service to be performed by the receiving device, the self-CTS packet may be selectively sent before a high-priority service is performed.

With reference to the first aspect, in a possible implementation, the first device stores historical information of APs that have been successfully accessed by the first device, and information about an AP that provides the third channel is included in the historical information. For the sake of information security, the terminal device may have no control permission on an AP channel that has not been accessed. If a self-CTS packet is sent on the AP channel that has not been accessed, a Wi-Fi network used by another user may be affected.

According to a second aspect, this application provides another method for implementing a Wi-Fi peer-to-peer service. The method includes: A second device receives, through a first channel, a first action frame sent by a first device, where the first action frame carries a channel switching parameter, and the channel switching parameter includes one or a combination of the following: channel information of a second channel, switching mode information, and DBAC mode information. The second device switches to the second channel based on the channel switching parameter. The second device performs Wi-Fi peer-to-peer service communication with the first device through the second channel.

With reference to the second aspect, in a possible implementation, the channel switching parameter includes an immediate switching mode, and the immediate switching mode is used to indicate the second device to switch to the second channel in response to the first action frame.

With reference to the second aspect, in a possible implementation, the channel switching parameter includes a delayed switching mode and an extension time corresponding to the delayed switching mode, and the delayed switching mode and the extension time are used to indicate the second device to switch to the second channel after a delay of the extension time.

With reference to the second aspect, in a possible implementation, the channel switching parameter includes a permanent switching mode, and the permanent switching mode is used to indicate the second device to continuously listen to the second channel and the first channel. The method further includes: The second device receives a second action frame sent by the first device, where the second action frame is used to indicate the second device to switch back to the first channel. The second device switches to the first channel based on the second action frame.

With reference to the second aspect, in a possible implementation, the channel switching parameter includes a fixed-duration switching mode and switching duration corresponding to the fixed-duration switching mode, and the fixed-duration switching mode and the switching duration are used to indicate the second device to switch back to the first channel after the switching duration starting from the switching to the second channel.

With reference to the second aspect, in a possible implementation, the channel switching parameter includes a DBAC slot allocation ratio and a scheduling periodicity, the DBAC slot allocation ratio is used to indicate a ratio of duration in which the second device listens to the first channel to duration in which the second device listens to the second channel in one scheduling periodicity, and the scheduling periodicity is used to indicate a sum of the duration for listening to the first channel and the duration for listening to the second channel that are consecutive. The method further includes: The second device listens to the first channel and the second channel based on the DBAC slot allocation ratio and the scheduling periodicity.

With reference to the second aspect, in a possible implementation, the channel information of the second channel includes a channel identifier and a frequency bandwidth of the second channel, and the frequency bandwidth is less than 20 MHz.

With reference to the second aspect, in a possible implementation, the first action frame is encrypted by using a key corresponding to the second device.

With reference to the second aspect, in a possible implementation, after the second device receives, through the first channel, the first action frame sent by the first device, the method further includes: The second device parses the first action frame based on the key corresponding to the second device, to determine the channel switching parameter. The second device sends an acknowledgement ACK to the first device, where the ACK is a response to the first action frame, and the ACK is used to indicate that the second device has successfully received and obtained the first action frame through parsing.

According to a third aspect, an embodiment of this application provides another method for implementing a Wi-Fi peer-to-peer service. The method includes: A first device sends a first action frame to a second device through a first channel, where the first action frame carries a channel switching parameter, and the channel switching parameter includes one or a combination of the following: channel information of a second channel, switching mode information, and dual band adaptive concurrent DBAC mode information. The first device switches to the second channel based on the channel switching parameter. The first device performs Wi-Fi peer-to-peer service communication with the second device through the second channel.

With reference to the third aspect, in a possible implementation, the channel switching parameter includes an immediate switching mode, and the immediate switching mode is used to indicate the second device to switch to the second channel in response to the first action frame.

With reference to the third aspect, in a possible implementation, the channel switching parameter includes a delayed switching mode and an extension time corresponding to the delayed switching mode, and the delayed switching mode and the extension time are used to indicate the second device to switch to the second channel after a delay of the extension time.

With reference to the third aspect, in a possible implementation, the channel switching parameter includes a permanent switching mode, and the permanent switching mode is used to indicate the second device to continuously listen to the second channel and the first channel. The method further includes: The first device sends a second action frame to the second device through the second channel, where the second action frame is used to indicate the second device to switch back to the first channel.

With reference to the third aspect, in a possible implementation, the channel switching parameter includes a fixed-duration switching mode and switching duration corresponding to the fixed-duration switching mode, and the fixed-duration switching mode and the switching duration are used to indicate the second device to switch back to the first channel after the switching duration starting from the switching to the second channel.

With reference to the third aspect, in a possible implementation, the channel switching parameter includes a DBAC slot allocation ratio and a scheduling periodicity, the DBAC slot allocation ratio is used to indicate a ratio of duration in which the second device listens to the first channel to duration in which the second device listens to the second channel in one scheduling periodicity, and the scheduling periodicity is used to indicate a sum of the duration for listening to the first channel and the duration for listening to the second channel that are consecutive.

With reference to the third aspect, in a possible implementation, the channel information of the second channel includes a channel identifier and a frequency bandwidth of the second channel, and the frequency bandwidth is less than 20 MHz.

With reference to the third aspect, in a possible implementation, that a first device sends a first action frame to a second device through a first channel includes: The first device broadcasts the first action frame on the first channel.

With reference to the third aspect, in a possible implementation, the channel switching parameter includes the channel identifier and the frequency bandwidth of the second channel, and the method further includes: The first device determines used communication channels in an environment in which the first device is currently located. The first device determines the channel identifier and the frequency bandwidth of the second channel based on the used communication channels, where there is no overlapping frequency band between the second channel and the used communication channels, or the second channel is an idlest channel in the used communication channels, or the second channel is a channel with best communication quality in the used communication channels.

With reference to the third aspect, in a possible implementation, the channel switching parameter includes the switching mode information and the DBAC mode information, the switching mode information includes a switching manner and/or switching duration for the second device to switch to the second channel, and the DBAC mode information includes the DBAC slot allocation ratio and/or the scheduling periodicity. The method further includes: The first device determines the switching mode information and the DBAC mode information based on a requirement of the Wi-Fi peer-to-peer service.

With reference to the third aspect, in a possible implementation, the first device prestores a key corresponding to the second device, and the first action frame is encrypted by using the key corresponding to the second device.

With reference to the third aspect, in a possible implementation, the method further includes: The first device receives an ACK sent by the second device, where the ACK is a response to the first action frame, and the ACK is used to indicate that the second device has successfully received and obtained the first action frame through parsing. That the first device switches to the second channel based on the channel switching parameter includes: The first device switches to the second channel based on the channel switching parameter and the ACK.

With reference to the third aspect, in a possible implementation, before the first device sends the first action frame to the second device through the first channel, the method further includes: The first device determines the used communication channels in the environment in which the first device is currently located. When the first device determines that there is a third channel, the first device sends a self-CTS packet through the third channel, where the third channel is one of the used communication channels, there is an overlapping frequency band between the third channel and the second channel, and the self-CTS packet is used to indicate a receiving device that receives the self-CTS packet to remain silent within a channel occupancy time declared by the self-CTS packet.

With reference to the third aspect, in a possible implementation, before the first device sends the self-CTS packet through the third channel, the method further includes: The first device determines that the Wi-Fi peer-to-peer service is a high-priority service.

With reference to the third aspect, in a possible implementation, the first device stores historical information of APs that have been successfully accessed by the first device, and information about an AP that provides the third channel is included in the historical information.

According to a fourth aspect, an embodiment of this application provides another method for implementing a Wi-Fi peer-to-peer service. The method includes: A first device determines used communication channels in an environment in which the first device is currently located. When the first device determines that there is a third channel, the first device sends a self-CTS packet through the third channel, where the third channel is one of the used communication channels, there is an overlapping frequency band between the third channel and a second channel, the second channel is a channel used by the first device to perform Wi-Fi peer-to-peer service communication, and the self-CTS packet is used to indicate a receiving device that receives the self-CTS packet to remain silent within a channel occupancy time declared by the self-CTS packet.

With reference to the fourth aspect, in a possible implementation, before the first device sends the self-CTS packet through the third channel, the method further includes: The first device determines that the Wi-Fi peer-to-peer service is a high-priority service.

With reference to the fourth aspect, in a possible implementation, the first device stores historical information of APs that have been successfully accessed by the first device, and information about an AP that provides the third channel is included in the historical information.

According to a fifth aspect, this application provides a communications device. The communications device includes one or more processors and a memory, the memory is coupled to the one or more processors, the memory is configured to store program code, and the one or more processors invoke the program code, so that the communications device performs the following operations: receiving, through a first channel, a first action frame sent by a first device, where the first action frame carries a channel switching parameter, and the channel switching parameter includes one or a combination of the following: channel information of a second channel, switching mode information, and DBAC mode information; switching to the second channel based on the channel switching parameter; and performing Wi-Fi peer-to-peer service communication with the first device through the second channel.

With reference to the fifth aspect, in a possible implementation, the channel switching parameter includes an immediate switching mode, and the immediate switching mode is used to indicate the communications device to switch to the second channel in response to the first action frame.

With reference to the fifth aspect, in a possible implementation, the channel switching parameter includes a delayed switching mode and an extension time corresponding to the delayed switching mode, and the delayed switching mode and the extension time are used to indicate the communications device to switch to the second channel after a delay of the extension time.

With reference to the fifth aspect, in a possible implementation, the channel switching parameter includes a permanent switching mode, and the permanent switching mode is used to indicate the communications device to continuously listen to the second channel and the first channel. The one or more processors invoke the program code, so that the communications device further performs the following operations: receiving a second action frame sent by the first device, where the second action frame is used to indicate the communications device to switch back to the first channel; and switching to the first channel based on the second action frame.

With reference to the fifth aspect, in a possible implementation, the channel switching parameter includes a fixed-duration switching mode and switching duration corresponding to the fixed-duration switching mode, and the fixed-duration switching mode and the switching duration are used to indicate the communications device to switch back to the first channel after the switching duration starting from the switching to the second channel.

With reference to the fifth aspect, in a possible implementation, the channel switching parameter includes a DBAC slot allocation ratio and a scheduling periodicity, the DBAC slot allocation ratio is used to indicate a ratio of duration in which the communications device listens to the first channel to duration in which the communications device listens to the second channel in one scheduling periodicity, and the scheduling periodicity is used to indicate a sum of the duration for listening to the first channel and the duration for listening to the second channel that are consecutive. The one or more processors invoke the program code, so that the communications device further performs the following operation: listening to the first channel and the second channel based on the DBAC slot allocation ratio and the scheduling periodicity.

With reference to the fifth aspect, in a possible implementation, the channel information of the second channel includes a channel identifier and a frequency bandwidth of the second channel, and the frequency bandwidth is less than 20 MHz.

With reference to the fifth aspect, in a possible implementation, the first action frame is encrypted by using a key corresponding to the communications device.

With reference to the fifth aspect, in a possible implementation, the one or more processors invoke the program code, so that the communications device further performs the following operations: parsing the first action frame based on the key corresponding to the communications device, to determine the channel switching parameter; and sending an acknowledgement ACK to the first device, where the ACK is a response to the first action frame, and the ACK is used to indicate that the communications device has successfully received and obtained the first action frame through parsing.

According to a sixth aspect, this application provides another communications device. The communications device includes one or more processors and a memory, the memory is coupled to the one or more processors, the memory is configured to store program code, and the one or more processors invoke the program code, so that the communications device performs the following operations: sending a first action frame to a second device through a first channel, where the first action frame carries a channel switching parameter, and the channel switching parameter includes one or a combination of the following: channel information of a second channel, switching mode information, and dual band adaptive concurrent DBAC mode information; switching to the second channel based on the channel switching parameter; and performing Wi-Fi peer-to-peer service communication with the second device through the second channel.

With reference to the sixth aspect, in a possible implementation, the channel switching parameter includes an immediate switching mode, and the immediate switching mode is used to indicate the second device to switch to the second channel in response to the first action frame.

With reference to the sixth aspect, in a possible implementation, the channel switching parameter includes a delayed switching mode and an extension time corresponding to the delayed switching mode, and the delayed switching mode and the extension time are used to indicate the second device to switch to the second channel after a delay of the extension time.

With reference to the sixth aspect, in a possible implementation, the channel switching parameter includes a permanent switching mode, and the permanent switching mode is used to indicate the second device to continuously listen to the second channel and the first channel. The one or more processors invoke the program code, so that the communications device further performs the following operation: sending a second action frame to the second device through the second channel, where the second action frame is used to indicate the second device to switch back to the first channel.

With reference to the sixth aspect, in a possible implementation, the channel switching parameter includes a fixed-duration switching mode and switching duration corresponding to the fixed-duration switching mode, and the fixed-duration switching mode and the switching duration are used to indicate the second device to switch back to the first channel after the switching duration starting from the switching to the second channel.

With reference to the sixth aspect, in a possible implementation, the channel switching parameter includes a DBAC slot allocation ratio and a scheduling periodicity, the DBAC slot allocation ratio is used to indicate a ratio of duration in which the second device listens to the first channel to duration in which the second device listens to the second channel in one scheduling periodicity, and the scheduling periodicity is used to indicate a sum of the duration for listening to the first channel and the duration for listening to the second channel that are consecutive.

With reference to the sixth aspect, in a possible implementation, the channel information of the second channel includes a channel identifier and a frequency bandwidth of the second channel, and the frequency bandwidth is less than 20 MHz.

With reference to the sixth aspect, in a possible implementation, the one or more processors invoke the program code, so that the communications device specifically performs the following operation: broadcasting the first action frame on the first channel.

With reference to the sixth aspect, in a possible implementation, the channel switching parameter includes the channel identifier and the frequency bandwidth of the second channel. The one or more processors invoke the program code, so that the communications device further performs the following operations: determining used communication channels in an environment in which the first device is currently located; and determining the channel identifier and the frequency bandwidth of the second channel based on the used communication channels, where there is no overlapping frequency band between the second channel and the used communication channels, or the second channel is an idlest channel in the used communication channels, or the second channel is a channel with best communication quality in the used communication channels.

With reference to the sixth aspect, in a possible implementation, the channel switching parameter includes the switching mode information and the DBAC mode information, the switching mode information includes a switching manner and/or switching duration for the second device to switch to the second channel, and the DBAC mode information includes the DBAC slot allocation ratio and/or the scheduling periodicity. The one or more processors invoke the program code, so that the communications device further performs the following operation: determining the switching mode information and the DBAC mode information based on a requirement of the Wi-Fi peer-to-peer service.

With reference to the sixth aspect, in a possible implementation, the communications device prestores a key corresponding to the second device, and the first action frame is encrypted by using the key corresponding to the second device.

With reference to the sixth aspect, in a possible implementation, the one or more processors invoke the program code, so that the communications device further performs the following operation: receiving an ACK sent by the second device, where the ACK is a response to the first action frame, and the ACK is used to indicate that the second device has successfully received and obtained the first action frame through parsing. The one or more processors invoke the program code, so that the communications device specifically performs the following operation: switching to the second channel based on the channel switching parameter and the ACK.

With reference to the sixth aspect, in a possible implementation, the one or more processors invoke the program code, so that the communications device further performs the following operations: determining the used communication channels in the environment in which the first device is currently located; and when determining that there is a third channel, sending a self-CTS packet through the third channel, where the third channel is one of the used communication channels, there is an overlapping frequency band between the third channel and the second channel, and the self-CTS packet is used to indicate a receiving device that receives the self-CTS packet to remain silent within a channel occupancy time declared by the self-CTS packet.

With reference to the sixth aspect, in a possible implementation, the one or more processors invoke the program code, so that the communications device further performs the following operation: determining that the Wi-Fi peer-to-peer service is a high-priority service.

With reference to the sixth aspect, in a possible implementation, the communications device stores historical information of APs that have been successfully accessed by the first device, and information about an AP that provides the third channel is included in the historical information.

According to a seventh aspect, an embodiment of this application provides another communications device. The communications device includes one or more processors and a memory, the memory is coupled to the one or more processors, the memory is configured to store program code, and the one or more processors invoke the program code, so that the communications device performs the following operations: determining used communication channels in an environment in which the first device is currently located; and when determining that there is a third channel, sending a self-CTS packet through the third channel, where the third channel is one of the used communication channels, there is an overlapping frequency band between the third channel and a second channel, the second channel is a channel used by the communications device to perform Wi-Fi peer-to-peer service communication, and the self-CTS packet is used to indicate a receiving device that receives the self-CTS packet to remain silent within a channel occupancy time declared by the self-CTS packet.

With reference to the seventh aspect, in a possible implementation, the one or more processors invoke the program code, so that the communications device further performs the following operation: determining that the Wi-Fi peer-to-peer service is a high-priority service.

With reference to the seventh aspect, in a possible implementation, the first device stores historical information of APs that have been successfully accessed by the first device, and information about an AP that provides the third channel is included in the historical information.

According to an eighth aspect, this application provides a chip. The chip includes a processor, a memory, and a communications interface, the memory stores a computer program, and the processor is configured to execute the computer program to perform the method in any one of the second aspect or the implementations of the second aspect, the method in any one of the third aspect or the implementations of the third aspect, or the method in any one of the fourth aspect or the implementations of the fourth aspect.

According to a ninth aspect, this application provides a computer program product. The computer program product includes computer instructions, and when the computer instructions are run on a communications device, the communications device is enabled to perform the method in any one of the second aspect or the implementations of the second aspect, the method in any one of the third aspect or the implementations of the third aspect, or the method in any one of the fourth aspect or the implementations of the fourth aspect.

According to a tenth aspect, this application provides a computer-readable storage medium, including instructions, and when the instructions are run on a communications device, the communications device is enabled to perform the method in any one of the second aspect or the implementations of the second aspect, the method in any one of the third aspect or the implementations of the third aspect, or the method in any one of the fourth aspect or the implementations of the fourth aspect.

In embodiments of this application, one of two devices that need to perform Wi-Fi peer-to-peer service communication may notify the other device of a channel switching parameter by sending a first action frame, and then both the two devices switch to a same channel indicated by the channel switching parameter to perform Wi-Fi peer-to-peer service communication. In the solutions, there is no need for both the two devices to perform channel scanning for a plurality of times, so that efficiency of establishing Wi-Fi peer-to-peer service communication can be improved.

BRIEF DESCRIPTION OF THE DRAWINGS

To describe technical solutions in embodiments of this application or in the conventional technology more clearly, the following briefly describes the accompanying drawings for describing embodiments or the conventional technology.

FIG. 5 is a schematic diagram of a frame format of an action frame according to an embodiment of this application;

DETAILED DESCRIPTION OF ILLUSTRATIVE EMBODIMENTS

Figure 1:
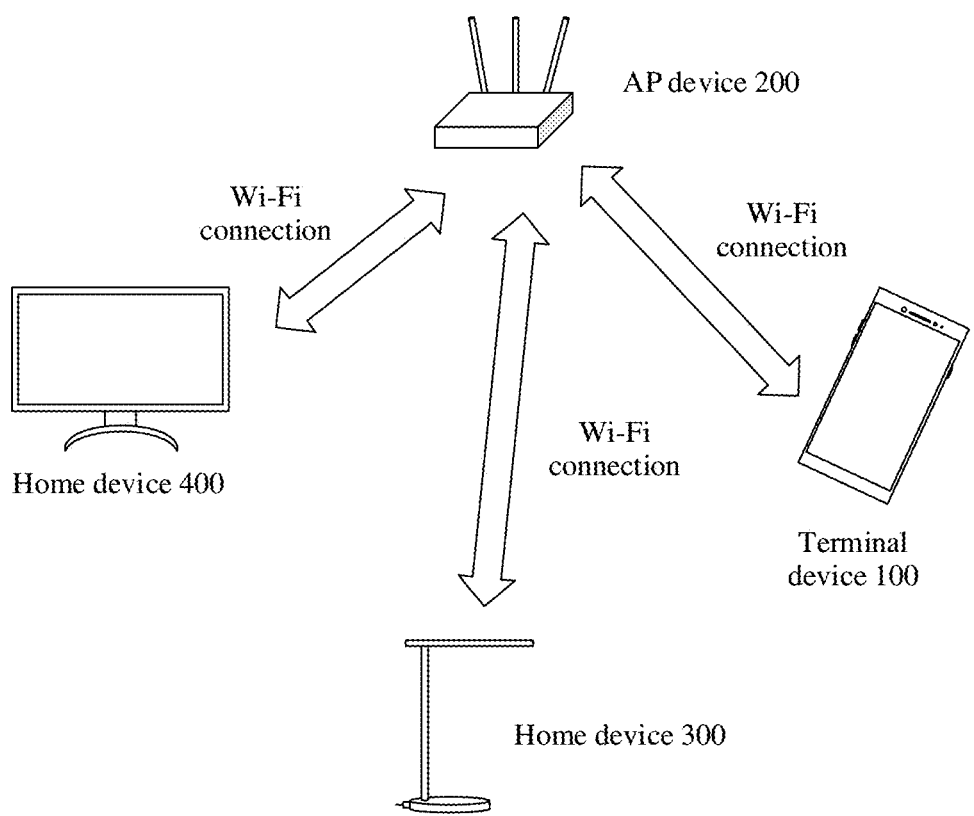
FIG. 1 is a schematic diagram of a Wi-Fi communications system according to an embodiment of this application.

The following describes the technical solutions in embodiments of this application in more detail.

The following clearly describes the technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

A user interface (UI) in embodiments of this application is a medium interface for interaction and information exchange between an application or an operating system and a user, and implements conversion between an internal form of information and a form acceptable to the user. A user interface of an application is source code written in a specific computer language such as Java or an extensible markup language (XML). The interface source code is parsed and rendered on an electronic device 300, and is finally presented as content that can be identified by the user, for example, a control such as a picture, a text, or a button. A control is a basic element of a user interface. Typical controls include a button, a widget, a toolbar, a menu bar, a text box, a scrollbar, a picture, and a text. An attribute and content of a control in an interface are defined by using a tag or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of a plurality of applications such as a hybrid application usually further include a web page. A web page, also referred to as a page, may be understood as a special control embedded in an interface of an application. A web page is source code written in a specific computer language, for example, a hypertext markup language (HTML), cascading style sheets (CSS), or JavaScript (JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (GUI), and is a user interface that is related to a computer operation and that is displayed in a graphical manner. The graphical user interface may be an interface element such as an icon, a window, or a control displayed on a display of an electronic device.

Wi-Fi peer-to-peer (Wi-Fi P2P) is a technology that supports peer-to-peer communication between Wi-Fi devices in the field of Wi-Fi technologies. By using the Wi-Fi P2P technology, communication between Wi-Fi devices can be implemented without an access point (AP). For example, the Wi-Fi P2P technology may be used to implement mirroring projection from a mobile phone to a smart television, file transmission between mobile phones, or control of a smart home appliance by a mobile phone. In the conventional technology, to implement a Wi-Fi P2P connection, a Wi-Fi direct technology may be used. In the Wi-Fi direct technology, two devices that need to establish communication simultaneously perform channel scanning (for example, scan a channel 1/6/11). In a device discovery process, the two devices first enter a scan phase. In this phase, the device sends a probe request frame on all frequency bands supported by the device. After the scan phase is completed, the device enters a find phase. In this phase, the device switches between a listen state and a search state. When the device is in the search state in the find phase, the device sends probe request frames on channels 1, 6, and 11. When the device is in the listen state in the find phase, the device listens to the probe request frames on the channels 1, 6, and 11. When two devices are on a same channel, a probe request frame sent by one of the devices can be received by the other device to implement device discovery. Channel scanning in this phase usually takes a long time.

In embodiments of this application, one of two devices that need to perform Wi-Fi peer-to-peer service communication may notify the other device of a channel switching parameter by using an action frame, and then both the two devices switch to a same channel indicated by the channel switching parameter to perform Wi-Fi peer-to-peer service communication. In the solutions, there is no need for both the two devices to perform channel scanning for a plurality of times, so that efficiency of establishing Wi-Fi peer-to-peer service communication can be improved. It should be noted that, in embodiments of this application, that two devices establish a Wi-Fi P2P connection means that both the two devices switch to a same channel to perform service transmission, to implement data communication between peer entities, and does not mean that the two devices are connected by using a Wi-Fi direct technology.

The following describes a Wi-Fi communications system provided in embodiments of this application. FIG. 1 is a schematic diagram of a Wi-Fi communications system according to an embodiment of this application. The Wi-Fi communications system 10 may include a terminal device 100, an AP device 200, a home device 300, and a home device 400.

The AP device 200 is a device that provides network access for a Wi-Fi device. In FIG. 1, a wireless router is used as an example. The AP device 200 may connect all Wi-Fi devices (for example, the terminal device 100, the home device 300, and the home device 400) together to access the Ethernet, thereby achieving an objective of network coverage.

The terminal device 100 may be an electronic device having a wireless communication function, such as a mobile terminal, a tablet computer, a notebook computer, or a personal computer. In FIG. 1, the mobile terminal is used as an example. The home device 300 and the home device 400 are electronic devices having a wireless communication function. In FIG. 1, an example in which the home device 300 is a smart lamp and the home device 400 is a smart television is used. The Wi-Fi communications system may further include another home device, for example, an electronic device having a wireless communication function, such as a smart refrigerator, a smart speaker, or an air purifier. There may be one or more home devices. This is not limited in this embodiment of this application. In this embodiment of this application, the terminal device 100, the home device 300, and the home device 400 are connected to a Wi-Fi network provided by a same AP device 200.

For example, an application scenario of this application may be a wireless local area network (WLAN) based on the Institute of Electrical and Electronics Engineers (IEEE) 802.11b/g/n/ax protocol standard, an internet of things (IoT) network based on the IEEE802.11b/g/n/b/g/n/ax protocol standard, a vehicle-to-everything (Vehicle-to-X, V2X) network based on the IEEE 802.11b/g/n/ax protocol standard, another network based on the IEEE 802.11b/g/n/ax protocol standard, a next-generation WLAN network based on the 802.11ax, an IoT network based on the IEEE802.11ax next-generation protocol standard, a vehicle-to-everything network based on the IEEE802.11ax next-generation protocol standard, another network based on the IEEE802.11ax next-generation protocol standard, or another WLAN network based on a future protocol standard.

Figure 2A:
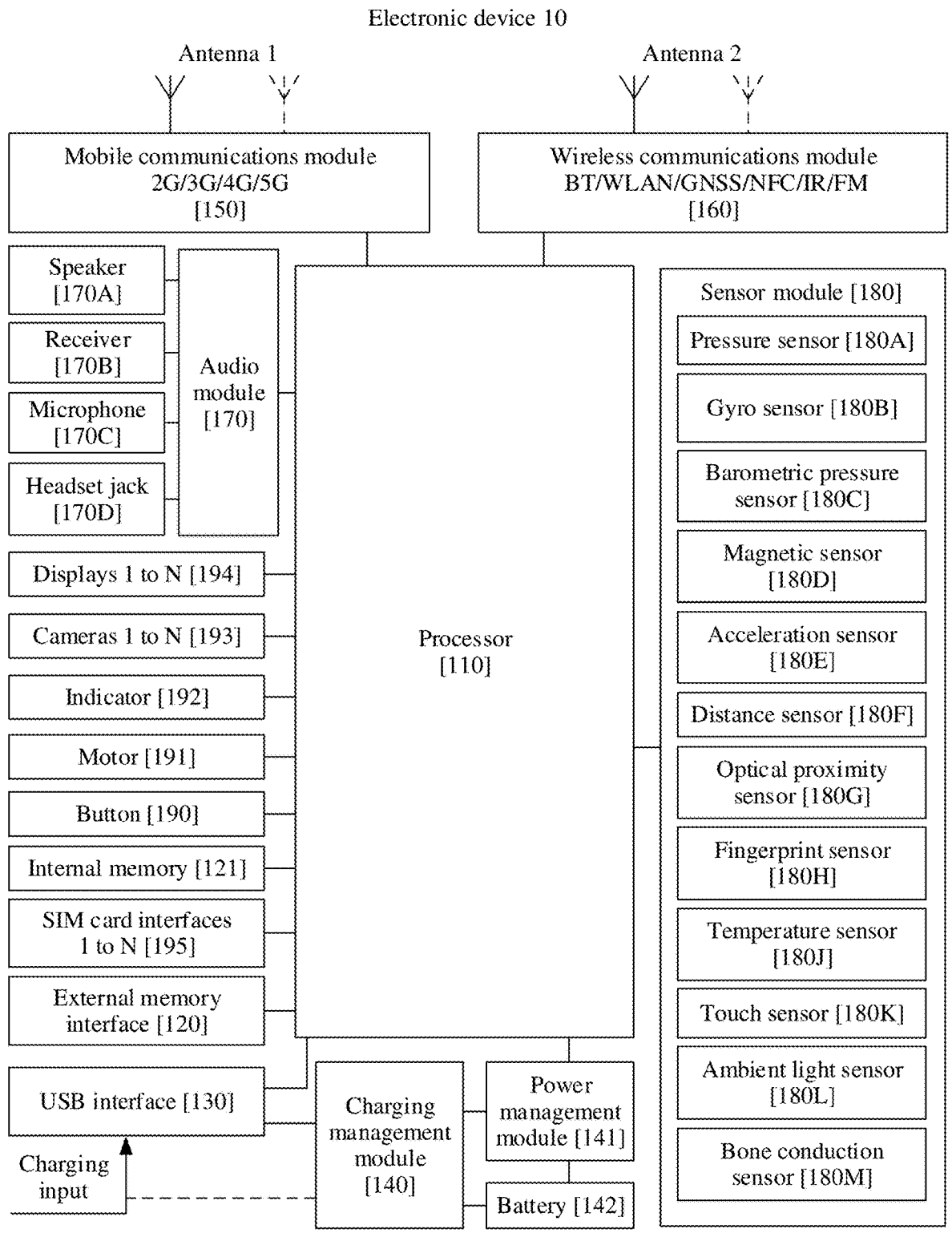
FIG. 2A is a schematic diagram of a structure of an electronic device 10 according to an embodiment of this application.

In this embodiment of this application, the terminal device 100 may be an electronic device. The following describes an electronic device 10 in embodiments of this application. FIG. 2A is a schematic diagram of a structure of an electronic device 10 according to an embodiment of this application.

The electronic device 10 may include a processor no, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be understood that the electronic device 10 shown in FIG. 2A is merely an example, and the electronic device 10 may include more or fewer components than those shown in FIG. 2A, may combine two or more components, or may have different component configurations. Components shown in the figure may be implemented by hardware including one or more signal processing and/or application-specific integrated circuits, software, or a combination of hardware and software.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 10. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). The processor 110 may be coupled to the touch sensor 180K through the I2C interface, so that the processor 110 communicates with the touch sensor 180K through the I2C bus interface, to implement a touch function of the electronic device 10.

The I2S interface may be configured to perform audio communication. In some embodiments, the processor 110 may include a plurality of groups of I2S buses. The processor no may be coupled to the audio module 170 through the I2S bus, to implement communication between the processor no and the audio module 170.

The PCM interface may also be configured to: perform audio communication, and sample, quantize, and encode an analog signal. In some embodiments, the audio module 170 may be coupled to the wireless communications module 160 through the PCM bus interface.

The UART interface is a universal serial data bus, and is configured to perform asynchronous communication. The bus may be a two-way communications bus. The bus converts to-be-transmitted data between serial communication and parallel communication.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the display 194 through the DSI interface, to implement a display function of the electronic device 10.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 10, or may be configured to transmit data between the electronic device 10 and a peripheral device.

It may be understood that an interface connection relationship between the modules that is shown in this embodiment of the present invention is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from the charger. The charger may be a wireless charger or a wired charger. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like.

A wireless communication function of the electronic device 10 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 10 may be configured to cover one or more communication frequency bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that is applied to the electronic device 10 and that includes 2G/3G/4G/5G. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194.

The wireless communications module 160 may provide a wireless communication solution that is applied to the electronic device 10 and that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like.

In some embodiments, in the electronic device 10, the antenna 1 is coupled to the mobile communications module 150, and the antenna 2 is coupled to the wireless communications module 160, so that the electronic device 10 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like.

The electronic device 10 implements the display function through the GPU, the display 194, the application processor, and the like. The GPU is a microprocessor for image processing, and connects the display 194 to the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 10 may include one or N displays 194, where N is a positive integer greater than 1.

The electronic device 10 may implement a shooting function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 is configured to capture a static image or a video. In some embodiments, the electronic device 10 may include one or N cameras 193, where N is a positive integer greater than 1.

The digital signal processor is configured to process a digital signal, and may further process another digital signal in addition to the digital image signal. For example, when the electronic device 10 selects a frequency, the digital signal processor is configured to perform Fourier transform and the like on frequency energy.

The video codec is configured to compress or decompress a digital video. The electronic device 10 may support one or more types of video codecs. In this way, the electronic device 10 may play or record videos in a plurality of encoding formats, for example, moving picture experts group (MPEG)-1, MPEG-2, MPEG-3, and MPEG-4.

The NPU is a neural-network (NN) computing processor. The NPU can implement applications such as intelligent cognition of the electronic device 10, such as image recognition, facial recognition, speech recognition, and text understanding.

The external memory interface 120 may be configured to connect to an external memory card, for example, a micro SD card, to extend a storage capability of the electronic device 10. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121 to perform various function applications of the electronic device 10 and process data. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 10.

The electronic device 10 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, or is configured to convert analog audio input into a digital audio signal. The audio module 170 may be further configured to encode and decode an audio signal.

The speaker 170A, also referred to as a "loudspeaker", is configured to convert an audio electrical signal into a sound signal. The electronic device 10 may be configured to listen to music or answer a hands-free call through the speaker 170A.

The receiver 170B, also referred to as an "earpiece", is configured to convert an audio electrical signal into a sound signal. When a call is answered or voice information is received by using the electronic device 10, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 10.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194.

The gyro sensor 180B may be configured to determine a motion posture of the electronic device 10. In some embodiments, an angular velocity of the electronic device 10 around three axes (namely, axes x, y, and z) may be determined through the gyro sensor 180B. The gyro sensor 180B may be configured to implement image stabilization during photographing. The gyro sensor 180B may also be used in a navigation scenario and a somatic game scenario.

The barometric pressure sensor 180C is configured to measure barometric pressure. In some embodiments, the electronic device 10 calculates an altitude based on a barometric pressure value measured by the barometric pressure sensor 180C, to assist in positioning and navigation.

The magnetic sensor 180D includes a Hall sensor. The electronic device 10 may detect opening and closing of a flip cover through the magnetic sensor 180D.

The acceleration sensor 180E may detect accelerations in various directions (usually on three axes) of the electronic device 10, and may detect magnitude and a direction of gravity when the electronic device 10 is still. The acceleration sensor 180E may be further configured to identify a posture of the electronic device, and is used in an application such as switching between a landscape mode and a portrait mode or a pedometer.

The distance sensor 180F is configured to measure a distance. The electronic device 10 may measure the distance in an infrared manner or a laser manner.

The optical proximity sensor 180G may include, for example, a light emitting diode (LED) and an optical detector, for example, a photodiode. The light emitting diode may be an infrared light emitting diode. The electronic device 10 emits infrared light by using the light emitting diode. The electronic device 10 detects infrared reflected light from a nearby object by using the photodiode.

The ambient light sensor 180L is configured to sense ambient light brightness. The electronic device 10 may adaptively adjust brightness of the display 194 based on the sensed ambient light brightness.

The fingerprint sensor 180H is configured to collect a fingerprint. The electronic device 10 may implement fingerprint-based unlocking, application lock access, fingerprint-based image shooting, fingerprint-based call answering, and the like by using a feature of the collected fingerprint.

The temperature sensor 180J is configured to detect a temperature. In some embodiments, the electronic device 10 executes a temperature processing policy based on the temperature detected by the temperature sensor 18J.

The touch sensor 180K is also referred to as a "touch panel". The touch sensor 180K may be disposed on the display 194, and the touch sensor 180K and the display 194 constitute a touchscreen. The touch sensor 180K is configured to detect a touch operation performed on or near the touch sensor. The touch sensor may transfer the detected touch operation to the application processor to determine a type of the touch event. For example, the touch event type may be a tap event, a double-tap event, a touch-and-hold event, a press (force touch) event, or a drag event. A visual output related to the touch operation may be provided through the display 194. In some other embodiments, the touch sensor 180K may alternatively be disposed on a surface of the electronic device 10 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The electronic device 10 may receive a button input, and generate a button signal input related to user settings and function control of the electronic device 10.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 10. The electronic device 10 may support one or N SIM card interfaces, where N is a positive integer greater than 1. The SIM card interface 195 may support a nano-SIM card, a micro-SIM card, a SIM card, and the like. In some embodiments, the electronic device 10 uses an eSIM, that is, an embedded SIM card. The eSIM card may be embedded in the electronic device 10, and cannot be separated from the electronic device 10.

A software system of the electronic device 10 may use a layered architecture, an event-driven architecture, a microkernel architecture, a micro service architecture, or a cloud architecture. In embodiments of this application, an Android system with a layered architecture is used as an example to describe a software structure of the electronic device 10.

Figure 2B:
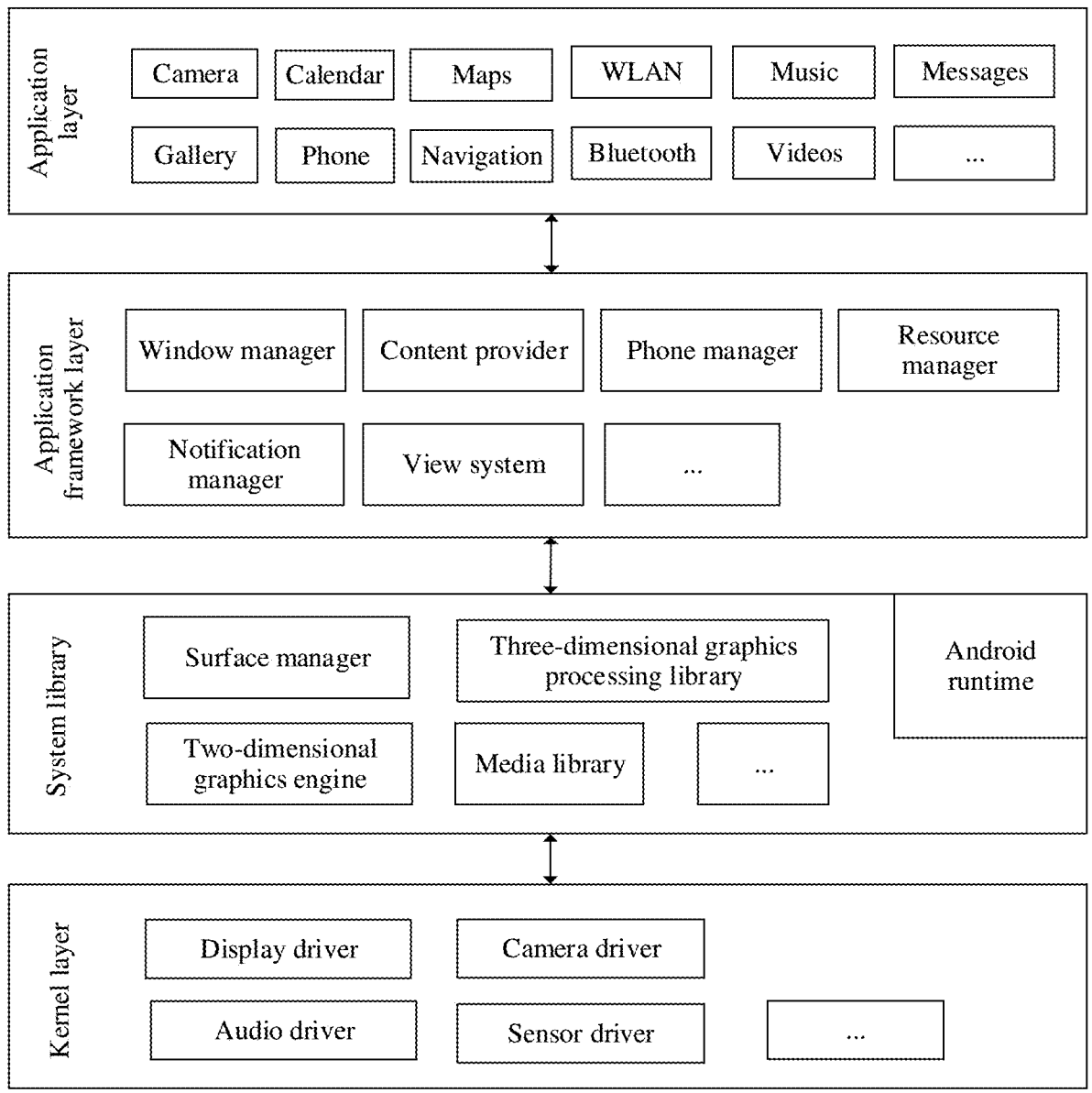
FIG. 2B is a block diagram of a software structure of an electronic device 10 according to an embodiment of this application.

FIG. 2B is a block diagram of a software structure of an electronic device 10 according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 2B, the application packages may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, so that the data can be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including a Messages notification icon may include a text display view and an image display view.

The phone manager is configured to provide a communication function of the electronic device 10, for example, management of a call status (including answering or declining a call).

The resource manager provides various resources for an application, such as a localized character string, an icon, an image, a layout file, and a video file.

The notification manager enables an application to display notification information in a status bar, and may be used to transmit a notification-type message. The displayed information may automatically disappear after a short pause without user interaction. For example, the notification manager is configured to notify download completion and give a message notification. The notification manager may alternatively be a notification that appears in a top status bar of the system in a form of a graph or a scroll bar text, for example, a notification of an application running in the background, or a notification that appears on the screen in a form of a dialog window. For example, text information is prompted in the status bar, a prompt tone is produced, a smart terminal vibrates, or an indicator light blinks.

The Android runtime includes a kernel library and a virtual machine. The Android runtime is responsible for scheduling and management of the Android system.

The kernel library includes two parts: a function that needs to be invoked in Java language, and a core library of Android.

The application layer and the application framework layer are run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL ES), and a two-dimensional (2D) graphics engine (for example, SGL).

The surface manager is configured to manage a display subsystem and provide fusion of 2D and 3D layers for a plurality of applications.

The media library supports playing and recording in a plurality of commonly used audio and video formats, and static image files. The media library may support a plurality of audio and video encoding formats, for example, MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 2C:
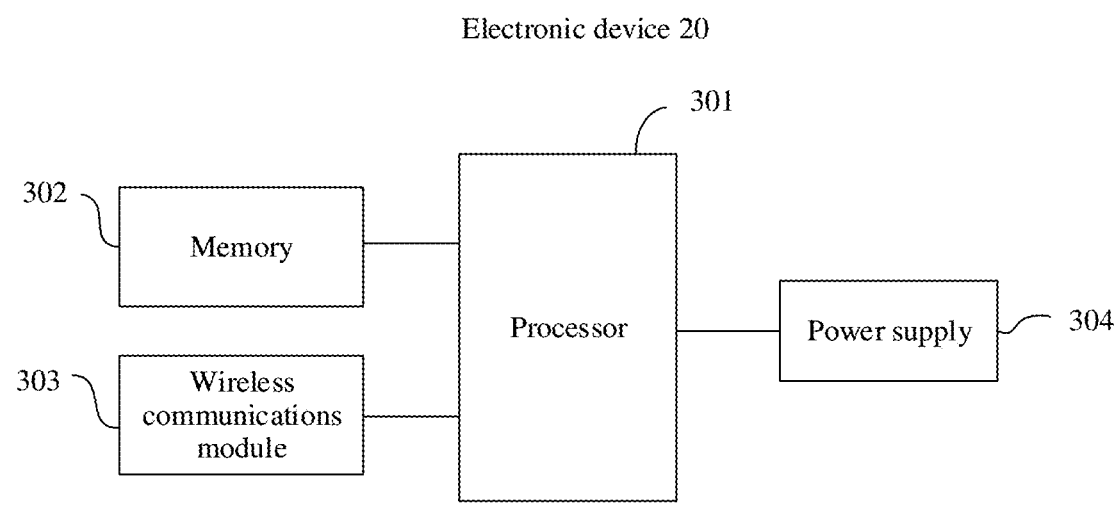
FIG. 2C is a schematic diagram of a structure of an electronic device 20 according to an embodiment of this application.

In this embodiment of this application, the home device 300 (or the home device 400) may be an electronic device (an electronic device 20 is used as an example). The following describes the electronic device 20 in this embodiment of this application. FIG. 2C is a schematic diagram of a structure of an electronic device 20 according to an embodiment of this application.

As shown in FIG. 2C, the electronic device 20 may include a processor 301, a memory 302, a wireless communications module 303, and a power supply 304. These components may be connected through a bus.

The processor 301 may be configured to read and execute computer-readable instructions, and the processor 301 executes application code, so that the electronic device 20 performs the method in embodiments of this application. During specific implementation, the processor 301 may mainly include a controller, an arithmetic unit, and a register. The controller is mainly responsible for decoding an instruction and sending a control signal for an operation corresponding to the instruction. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. During specific implementation, a hardware architecture of the processor 301 may be an application-specific integrated circuit (ASIC) architecture, an MIPS architecture, an ARM architecture, an NP architecture, or the like.

In some embodiments, the processor 301 may be configured to parse a signal received by the wireless communications processing module 303. For example, the received signal may be an action frame sent by the electronic device 10. The processor 301 may be configured to perform a corresponding processing operation based on a parsing result of the action frame. For example, after receiving the action frame, the electronic device 20 sends an acknowledgement (ACK) to the electronic device 10, or the electronic device 20 may switch a channel according to an indication of the action frame.

In some embodiments, the processor 301 may be further configured to generate a signal sent by the wireless communications processing module 303, for example, an ACK sent by the electronic device 20 to the electronic device 10.

The memory 302 is coupled to the processor 301, and is configured to store various software programs and/or a plurality of groups of instructions. During specific implementation, the memory 302 may include a high-speed random access memory, and may further include a nonvolatile memory, for example, one or more magnetic disk storage devices, a flash memory, or another nonvolatile solid-state storage device. The memory 302 may further store a communication program, and the communication program may be used to communicate with the electronic device 10.

The wireless communications processing module 303 may include a Wi-Fi communications processing module. The wireless communications module 303 may provide a WLAN access function for the electronic device 20. The wireless communications module 303 may be further configured to support short-distance data exchange between the electronic device 20 and the electronic device 10.

The power supply 304 may be configured to supply power to each component included in the electronic device 20. In some embodiments, the power supply 304 may be a battery, for example, a rechargeable battery.

It may be understood that the structure shown in this embodiment of this application does not constitute a specific limitation on the electronic device 20. The electronic device 20 may have more or fewer components than those shown in FIG. 2C, may combine two or more components, or may have different component configurations. The components shown in FIG. 2C may be implemented by hardware, software, or a combination of software and hardware.

Based on the Wi-Fi communications system 10, the electronic device 10, and the electronic device 20 described in the foregoing content, the following describes in detail a method for establishing a Wi-Fi P2P connection provided in embodiments of this application with reference to the other accompanying drawings. For example, the electronic device 10 may be the terminal device 100, the electronic device 20 may be the home device 300 (smart lamp), or the electronic device 20 may be the home device 400 (smart television). In this example, the terminal device 100, the home device 300 (smart lamp), and the home device 400 (smart television) are all connected to a Wi-Fi network provided by the AP device 200. For example, the AP device 200 performs data transmission through a channel 1 with a 20 MHz frequency bandwidth. The terminal device 100, the smart lamp, and the smart television all can listen on the channel 1 with the 20 MHz frequency bandwidth.

Figure 3:
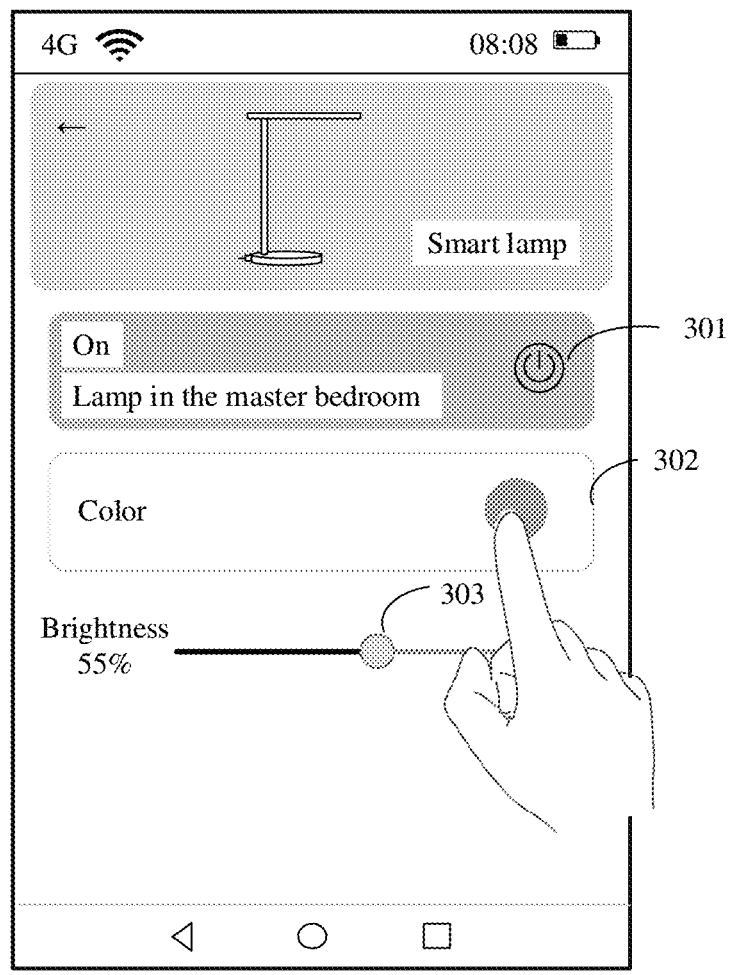
FIG. 3 is a schematic diagram of a display interface of a terminal device 100 according to an embodiment of this application.

The terminal device 100 may manage and control the smart lamp and the smart television. FIG. 3 is a schematic diagram of a display interface of a terminal device 100 according to an embodiment of this application. A user interface 10 is configured to display a control interface of the smart lamp. The user interface includes a control 301, a control 302, and a control 303. The control 301 may be configured to adjust an on/off state of the smart lamp. The control 302 may be configured to adjust a display color of the smart lamp. The control 303 may be configured to adjust display brightness of the smart lamp. For example, a user may perform an operation (for example, a tap operation or a double-tap operation) on the control 303, to switch the color of the smart lamp. The terminal device may establish a Wi-Fi P2P connection between the terminal device and the smart lamp, to send an instruction for controlling the smart lamp, so as to implement Wi-Fi peer-to-peer service communication.

Figure 4:
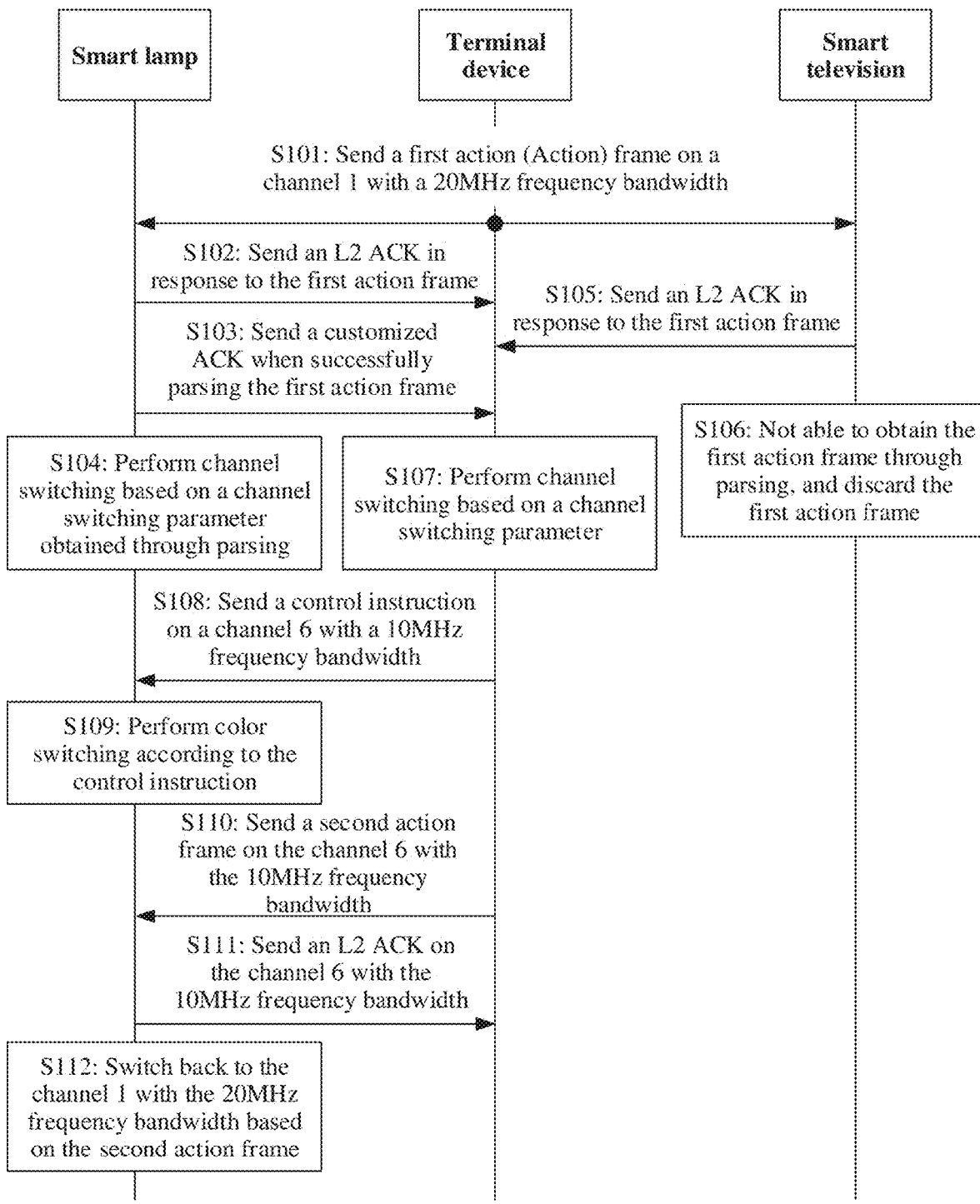
FIG. 4 is a flowchart of a method for implementing a Wi-Fi peer-to-peer service according to an embodiment of this application.

The following describes a process of implementing Wi-Fi peer-to-peer service communication between the terminal device and the smart lamp. FIG. 4 is a flowchart of a method for implementing a Wi-Fi peer-to-peer service according to an embodiment of this application. The method includes the following steps.

S101: A terminal device sends a first action frame on a channel 1 with a 20 MHz frequency bandwidth.

It should be noted that the terminal device sends the first action frame in a broadcast manner. The action frame is a management frame specified in the IEEE 802.11 protocol. The management frame may trigger a device that receives the management frame to perform a specific operation. The action frame may be directly sent and received by all receiving devices on a channel sent by the terminal device, without waiting for request to send/clear to send (RTS/CTS) on the channel, so that efficiency of establishing a Wi-Fi P2P connection can be improved.

FIG. 5 is a schematic diagram of a frame format of an action frame according to an embodiment of this application. As shown in FIG. 5, the action frame includes a plurality of fields: a frame control field, a duration field, three address fields (DA, SA, and BSS ID), a sequence control (Seq-ctl) field, a category field, an action details field (including an action subfield and other elements, where a quantity of bytes of the element is variable and may be defined based on a requirement), and a frame check sequence (FCS) field. The frame control field includes a frame type subfield. Specifically, if the type subfield is 00, it indicates that the frame is a management frame; if the type subfield is 01, it indicates that the frame is a control frame; or if the type subfield is 10, it indicates that the frame is a data frame. The action frame in this embodiment of this application is a management frame. The category field may be used to indicate a category of the action frame. For example, if the field is 0, it indicates that the action frame is of a spectrum management category; if the field is 1, it indicates that the action frame is of a quality of service (QoS) category; or if the field is 3, it indicates that the action frame is of a block acknowledgement (Block ACK) category. In this embodiment of this application, the category field may be 127, indicating that the field is of a vendor specific category.

Specifically, the action frame in this embodiment of this application may carry a channel switching parameter. The channel switching parameter may include one or more of channel information (for example, a channel, a frequency bandwidth, and protocol information), switching mode information (for example, an immediate switching mode, a delayed switching mode, a fixed-duration switching mode, a permanent switching mode, an extension time corresponding to the delayed switching mode, and switching duration corresponding to the fixed-duration switching mode), dual band adaptive concurrent (DBAC) mode information (for example, a DBAC slot allocation ratio and a scheduling periodicity), and an ACK response identifier.

Figure 6:
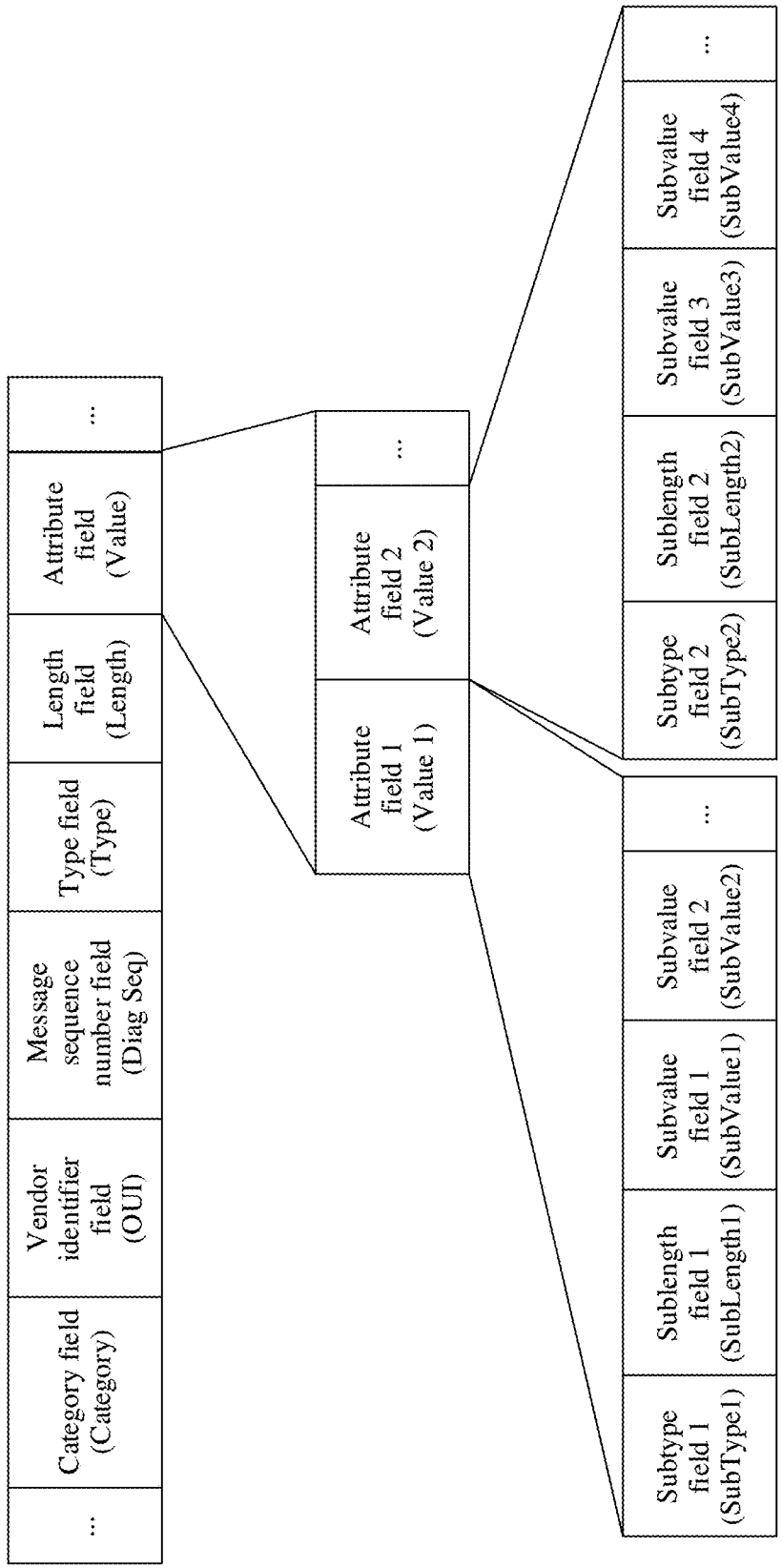
FIG. 6 is a schematic diagram of a frame format of a vendor specific field according to an embodiment of this application.

FIG. 6 is a schematic diagram of a frame format of a vendor specific field according to an embodiment of this application. Optionally, the vendor specific field shown in FIG. 6 may further include other fields, for example, a coding type field, a modulation and coding scheme (MCS) field, a tail field, and a padding field. A sequence of the plurality of fields included in the vendor specific field may alternatively be changed. This is not specifically limited in this embodiment of this application. The vendor specific field may include one or more value fields, for example, two value fields. In addition, for a format definition of each field, refer to Table 1 and Table 2.

For example, Table 1 shows a feasible format definition of the vendor specific field.

TABLE 1

| Quantity of bytes | 1 | 3 | 1 | 1 | 1 | Variable (0 to 250) |
|---|---|---|---|---|---|---|
| Field | Category | OUI (vendor identifier) | Diag Seq (message sequence number) | Type (type) | Length (length) | Value (attribute) |
| Value | 127 | Value specified by the vendor (or referred to as a preset value) | 0 by default (or another value) | 4 (or another value) | Length of the value field | For details about a value, refer to Table 2 |

For example, Table 2 shows a feasible format definition of the value field.

TABLE 2

| Field | SubType | SubLength | SubValue 1 | SubValue 2 | SubValue 3 | SubValue 4 |
|---|---|---|---|---|---|---|
| Quantity of bytes | 1 | 1 | 1 | 1 | 1 | ... |
| Value (definition) | 1 (channel information) | 3 | Channel | 1/2/5/10 (frequency bandwidth) | b/g/n/ax (protocol) | |
| | 2 (switching mode information) | 4 | 1 (immediate switching mode) 2 (delayed switching mode) | 1 (fixed-duration switching mode) 2 (permanent switching mode) | Extension time corresponding to the delayed switching mode | Switching duration corresponding to the fixed-duration switching mode |
| | 3 (DBAC mode information) 4 (ACK response) | 2 | DBAC slot allocation ratio | Scheduling periodicity | | |

The following further describes the content in Table 2. The subtype field is used to indicate a type of the value field corresponding to the subtype field, and the type includes channel information, a switching mode, a DBAC mode, and an ACK response. Specifically, when the value of the subtype field is 1, the type of the value field is the channel information. When the value of the subtype field is 2, the type of the value field is the switching mode. When the value of the subtype field is 3, the type of the value field is the DBAC mode. When the value of the subtype field is 4, the type of the value field is the ACK response. Optionally, the foregoing values are merely examples, and there may be another value setting manner, for example, 00, 01, 10, and 11, or 01, 02, 03, and 04. Optionally, the value field may further include another type.

The sublength field may be used to indicate a length of the subvalue field. For example, when the value of the subtype field is 1, the type of the value field is the channel information, the value field includes three subvalue fields, and a value of the sublength field is 3. It should be noted that the subvalue field in the table is merely an example, and the subvalue field may be added or deleted based on a requirement. The value of the sublength field changes with the length of the subvalue field.

The subvalue field may be used to indicate a channel switching parameter. For example, when the value of the subtype field is 1, the type of the value field is the channel information. The value of the subvalue 1 is used to indicate a channel (whose value is set based on a Wi-Fi standard channel) to which a receiving device switches. For example, 4 represents a channel 4, 6 represents a channel 6, and 11 represents a channel 11. The value of the subvalue 2 is used to indicate a frequency bandwidth occupied by the channel to which the receiving device switches. For example, 1 represents that the frequency bandwidth is 1M, 2 represents that the frequency bandwidth is 2M, 5 represents that the frequency bandwidth is 5M, and 10 represents that the frequency bandwidth is 10 MHz. The value of the subvalue 3 is used to indicate a protocol used by a WLAN network. For example, b represents the IEEE802.11b protocol, g represents the IEEE802.11g protocol, n represents the IEEE802.11n protocol, and ax represents the IEEE802.11ax protocol.

For another example, when the value of the subtype field is 2, the type of the value field is the switching mode. The value of the subvalue 1 is used to indicate a switching manner. For example, 1 represents an immediate switching mode, and 2 represents a delayed switching mode. The value of the subvalue 2 is used to indicate switching duration. For example, 1 represents a fixed-duration switching mode (which may be understood as that the switching duration is a preset value), and 2 represents a permanent switching mode (which may be understood as that the Wi-Fi P2P connection is always maintained before a next action frame is received). The value of the subvalue 3 is used to indicate an extension time corresponding to the delayed switching mode, for example, 1 (minute), 5 (milliseconds), or 2 (hours). The value of the subvalue 4 is used to indicate switching duration corresponding to the fixed-duration switching mode, for example, 5 (minutes) or 20 (minutes).

Figure 7:
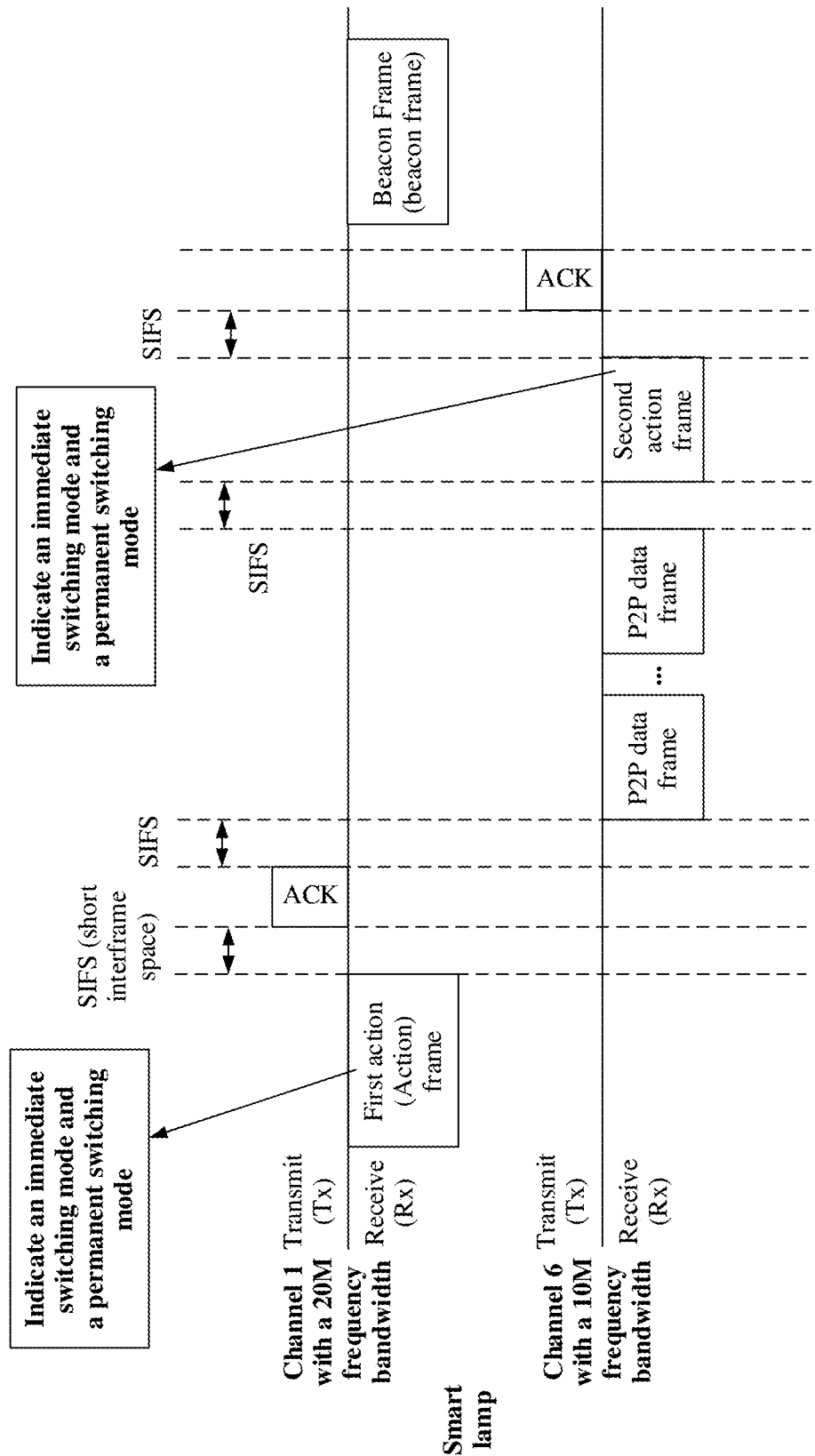
FIG. 7 and FIG. 8 are some schematic flowcharts of sending/receiving a frame by a smart lamp according to embodiments of this application.
Figure 8:
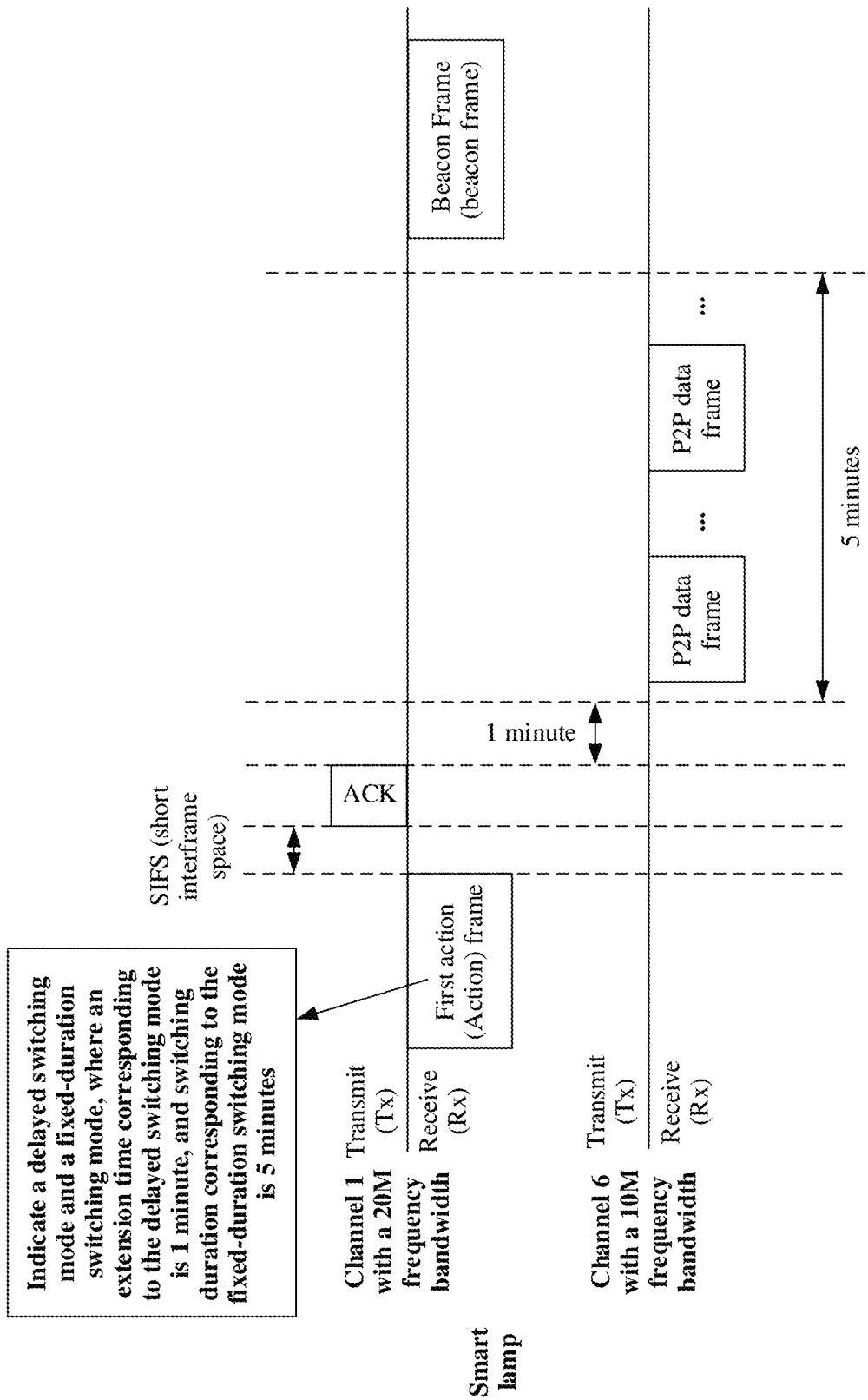

For example, FIG. 7 and FIG. 8 are some schematic flowcharts of sending/receiving a frame by a smart lamp according to embodiments of this application. Specifically, in FIG. 7, channel information included in the first action frame is a 10 MHz frequency bandwidth and a channel 6, and switching mode information is an immediate switching mode and a permanent switching mode. Channel information included in a second action frame is a 20 MHz frequency bandwidth and a channel 1, and switching mode information is an immediate switching mode and a permanent switching mode. After the smart lamp receives the first action frame, the smart lamp sends an ACK to the terminal device. Then, the smart lamp immediately switches a mode to the channel 6 with the 10 MHz frequency bandwidth that is indicated by the first action frame. Next, the smart lamp listens to the channel 6 with the 10 MHz frequency bandwidth and the channel 1 with the 20 MHz frequency bandwidth according to a DBAC mode indicated by the first action frame. Before receiving the second action frame, the smart lamp continuously listens to the channel 6 with the 10 MHz frequency bandwidth and the channel 1 with the 20 MHz frequency bandwidth. After receiving the second action frame, the smart lamp sends an ACK to the terminal device. Then, the smart lamp immediately switches a mode to the channel 1 with the 20 MHz frequency bandwidth that is indicated by the second action frame. Before receiving a next action frame, the smart lamp continuously listens to the channel 1 with the 20 MHz frequency bandwidth, and does not listen to the channel 6 with the 10 MHz frequency bandwidth.

In FIG. 8, channel information included in the first action frame is a 10 MHz frequency bandwidth and a channel 6, switching mode information is a delayed switching mode and a fixed-duration switching mode, an extension time corresponding to the delayed switching mode is 1 minute, and switching duration corresponding to the fixed-duration switching mode is 5 minutes. After the smart lamp receives the first action frame, the smart lamp sends an ACK to the terminal device. After 1 minute, the smart lamp switches to the channel 6 with the 10 MHz frequency bandwidth that is indicated by the first action frame. Next, the smart lamp listens to the channel 6 with the 10 MHz frequency bandwidth and the channel 1 with the 20 MHz frequency bandwidth according to a DBAC mode indicated by the first action frame. After a Wi-Fi P2P connection lasts for 5 minutes, the smart lamp switches back to the channel 1 with the 20 MHz frequency bandwidth, and does not listen to the channel 6 with the 10 MHz frequency bandwidth.

In addition, the switching mode information included in the first action frame may alternatively be an immediate switching mode and a fixed-duration switching mode, where switching duration corresponding to the fixed-duration switching mode is a preset value; or may be a delayed switching mode and a permanent switching mode, where an extension time corresponding to the delayed switching mode is a preset value. The two manners may be understood with reference to the switching manners described in FIG. 7 and FIG. 8.

Figure 9:
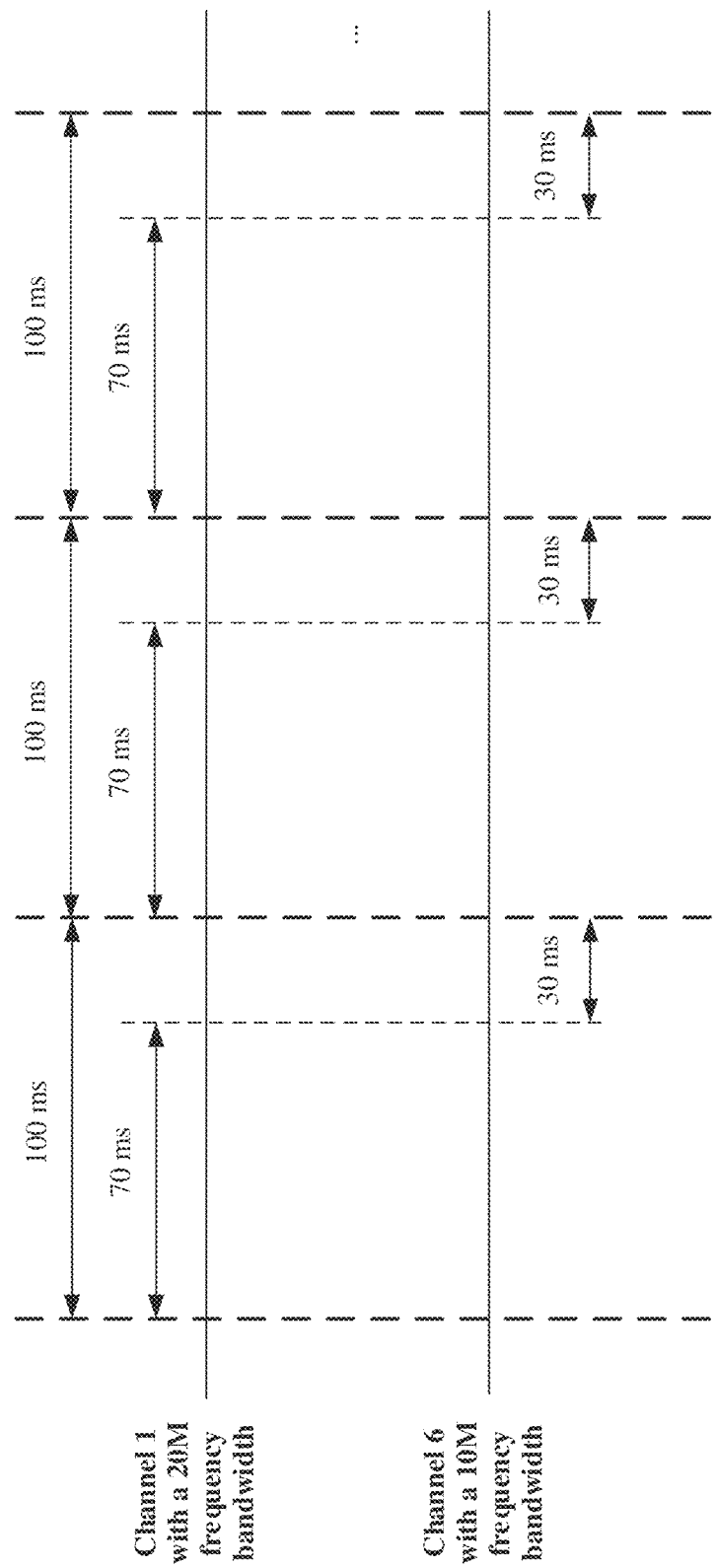
FIG. 9 is a schematic flowchart of listening to two channels by a receiving device according to an embodiment of this application.

For another example, when the value of the subtype field is 3, the type of the value field is the DBAC mode. The value of the subvalue 1 is used to indicate a DBAC slot allocation ratio, and the DBAC slot allocation ratio may be used to indicate a ratio of duration in which a receiving device listens on a channel before switching to duration in which the receiving device listens on a channel after switching in one scheduling periodicity. For example, if the DBAC slot allocation ratio is 7:3, it indicates that the ratio of the duration in which the receiving device listens to the channel before switching to the duration in which the receiving device listens to the channel after switching in one scheduling periodicity is 7:3. It should be noted that the DBAC slot allocation ratio may alternatively be a ratio. In another possible implementation, the DBAC slot allocation ratio may alternatively indicate a ratio of duration in which a receiving device listens on a channel after switching to duration in which the receiving device listens on a channel before switching in one scheduling periodicity. The value of the subvalue 2 is used to indicate a scheduling periodicity, and the scheduling periodicity may be used to indicate a sum of the duration for listening to the channel before switching and the duration for listening to the channel after switching that are consecutive. For example, if the scheduling periodicity is 2 (minutes), it indicates that the sum of the duration for listening to the channel before switching and the duration for listening to the channel after switching is 2 (minutes). FIG. 9 is a schematic flowchart of listening to two channels by a receiving device according to an embodiment of this application. The channel before switching is the channel 1 with the 20 MHz frequency bandwidth, the channel after switching is the channel 6 with the 10 MHz frequency bandwidth, the DBAC slot allocation ratio is 7:3, and the scheduling periodicity is 100 milliseconds (ms).

For another example, when the value of the subtype field is 4, the type of the value field is the ACK response. In this case, the vendor specific field may not include the subvalue field and the sublength field. Such a frame may be a response of the receiving device to the action frame sent by the terminal device, and indicates that the receiving device has successfully received and obtained the action frame through parsing.

It should be noted that the foregoing values are merely examples, and there may be another value setting manner.

In some embodiments, the terminal device may determine, based on a service requirement and a current air interface channel status, the channel switching parameter included in the first action frame. Optionally, when determining the channel information in the channel switching parameter, the terminal device may select a channel and a frequency bandwidth that are not occupied in an environment in which the terminal device is currently located. For example, the terminal device may scan AP information (for example, a channel and a frequency bandwidth) in the environment, and determine, based on the scanned AP information, that the channel information in the channel switching parameter is the channel and the frequency bandwidth that are not occupied. In a possible implementation, all channels in the environment are occupied, and the terminal device may select a channel and a frequency bandwidth that are relatively idle from these channels. In another possible implementation, the terminal device may determine a channel and a frequency bandwidth with reference to communication quality of the channel. In other words, the terminal device may select a channel and a frequency bandwidth that are not occupied (or relatively idle) and that have relatively good communication quality. In another possible implementation, the terminal device may determine a frequency bandwidth with reference to a service requirement. For example, if a service needs a relatively large amount of data to be transmitted, a relatively large frequency bandwidth may be determined; or if the service needs a relatively small amount of data to be transmitted, a relatively small frequency bandwidth may be determined.

Optionally, the terminal device may determine the switching mode information and the DBAC mode information in the channel switching parameter based on an actual service requirement. For example, if a service needs the receiving device that receives the action frame to quickly switch a channel, the terminal device may determine that the switching mode is the immediate switching mode. For another example, if the service needs the receiving device to switch a channel within a preset time, the terminal device may determine that the switching mode is the delayed switching mode. For another example, if the service needs a relatively large amount of data to be transmitted on a communication channel after switching, the terminal device may determine that duration for listening to the channel after switching accounts for a relatively large proportion in the DBAC slot allocation ratio.

In some embodiments, the first action frame sent by the terminal device is an encrypted frame. The terminal device may encrypt the action frame based on a key corresponding to the receiving device (that is, the smart lamp in this example) that needs to be controlled. Specifically, the terminal device and one or more receiving devices negotiate with each other about a key in advance. There is a correspondence between a key and a receiving device, and different receiving devices correspond to different keys.

S102: The smart lamp receives the first action frame, and sends an L2 ACK to the terminal device in response to the first action frame.

The L2 ACK is an ACK based on a MAC layer, and is used to indicate that the receiving device (that is, the smart lamp) successfully receives the first action frame.

S103: When the smart lamp successfully parses the first action frame, the smart lamp sends a customized ACK to the terminal device.

Specifically, the smart lamp may parse the first action frame by using a pre-negotiated key, to obtain the channel switching parameter carried in the first action frame. Because the first action frame is encrypted by the terminal device based on the key of the smart lamp, the smart lamp may successfully obtain the first action frame through parsing. The customized ACK may be the action frame whose subtype field has a value of 4 described in the foregoing content. That is, the customized ACK is an ACK response, and is used to indicate that the smart lamp has successfully received and obtained the first action frame through parsing.

In some embodiments, the customized ACK sent by the smart lamp to the terminal device may be an encrypted frame. The key used for encryption may be a key pre-negotiated between the terminal device and the smart lamp.

S104: The smart lamp performs channel switching based on the channel switching parameter obtained through parsing.

For example, the channel switching parameter may be the channel 6, the 10 MHz frequency bandwidth, the immediate switching mode, or the permanent switching mode.

S105: A smart television receives the first action frame, and sends an L2 ACK to the terminal device in response to the first action frame.

The L2 ACK is used to indicate that the smart television successfully receives the first action frame.

S106: The smart television cannot obtain the first action frame through parsing, and discards the first action frame.

Specifically, the smart television may parse the first action frame by using a pre-negotiated key. Because the first action frame is encrypted by the terminal device based on the key of the smart lamp, the smart television cannot successfully obtain the first action frame through parsing.

S107: After the terminal device receives the customized ACK sent by the smart lamp, the terminal device performs channel switching based on the channel switching parameter.

In this case, both the terminal device and the smart lamp switch to the channel 6 with the 10 MHz frequency bandwidth, and the terminal device and the smart lamp may perform a peer-to-peer service for controlling the smart lamp on the channel 6 with the 10 MHz frequency bandwidth. In some embodiments, the terminal device may immediately perform channel switching after sending the first action frame, or may perform channel switching after sending the first action frame, and waiting for a first preset time.

In some embodiments, if the terminal device receives no customized ACK within a second preset time after the first action frame is sent, the terminal device may send the first action frame again. Optionally, the terminal device may attempt to send the first action frame again for N times, where N is an integer greater than 1.

S108: The terminal device sends a control instruction to the smart lamp on the channel 6 with the 10 MHz frequency bandwidth.

For example, the control instruction may be a control instruction for instructing the smart lamp to switch a color.

S109: After the smart lamp receives the control instruction, the smart lamp performs color switching according to the control instruction.

In some embodiments, after step S109, the method may further include the following steps.

S110: The terminal device sends the second action frame to the smart lamp on the channel 6 with the 10 MHz frequency bandwidth.

The second action frame is used to indicate the smart lamp to switch back to the channel 1 with the 20 MHz frequency bandwidth. In some embodiments, the second action frame sent by the terminal device may be an encrypted frame. The key used for encryption may be a key pre-negotiated between the terminal device and the smart lamp.

S111: After the smart lamp receives the second action frame, the smart lamp sends an L2 ACK to the terminal device on the channel 6 with the 10 MHz frequency bandwidth.

S112: The smart lamp switches back to the channel 1 with the 20 MHz frequency bandwidth based on the second action frame.

In this case, the terminal device does not communicate with the smart lamp on the channel 6 with the 10 MHz frequency bandwidth.

Figure 10:
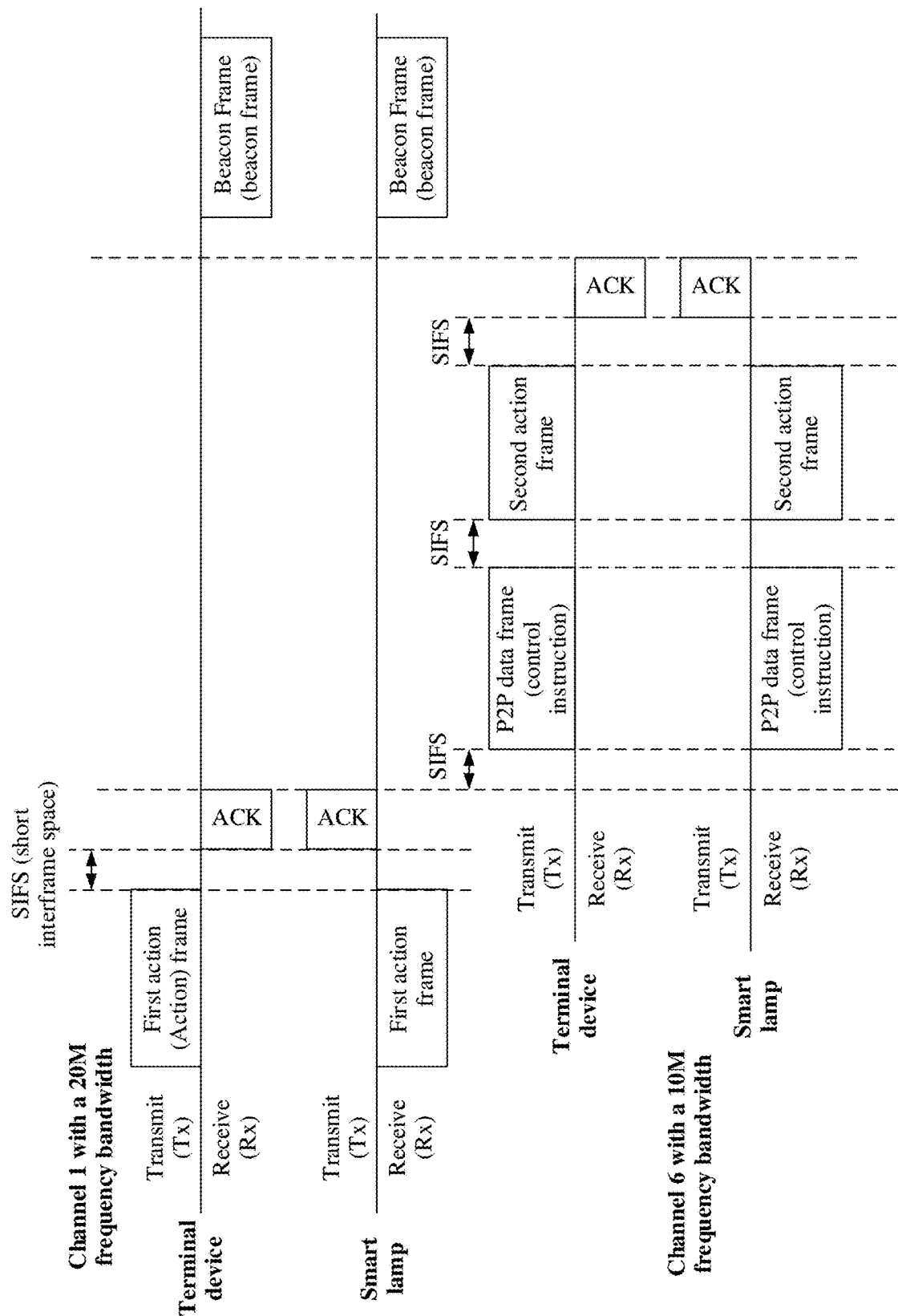
FIG. 10 is a flowchart of sending/receiving a frame in a process of establishing a Wi-Fi P2P connection according to an embodiment of this application.

In some embodiments, after receiving the second action frame, the smart lamp may parse the second action frame by using a pre-negotiated key. When the smart lamp successfully parses the second action frame, the smart lamp switches back to the channel 1 with the 20 MHz frequency bandwidth according to an indication of the action frame, and sends a customized ACK to the terminal device. Specifically, the customized ACK is an ACK response, and is used to indicate that the smart lamp has successfully received and obtained the second action frame through parsing. For information exchange between the terminal device and the smart lamp described in FIG. 4, refer to FIG. 10. FIG. 10 is a flowchart of sending/receiving a frame in a process of establishing a Wi-Fi P2P connection according to an embodiment of this application.

In some other embodiments, if the channel switching parameter carried in the action frame sent by the terminal device on the channel 1 with the 20 MHz frequency bandwidth includes the fixed-duration switching mode, the smart lamp may switch back to the channel 1 with the 20 MHz frequency bandwidth when fixed duration expires.

According to the method for establishing a Wi-Fi P2P connection described in the foregoing content, a time waste caused by channel scanning by an electronic device can be avoided, so that the electronic device can perform channel switching based on a service requirement, thereby improving efficiency of establishing a Wi-Fi P2P connection.

In some embodiments, to reduce signal interference occurring when the terminal device communicates with the smart lamp on the channel 6 with the 10 MHz frequency bandwidth, and avoid control instruction packet loss, the terminal device may further send, before switching to the channel 6 with the 10 MHz frequency bandwidth, a self-CTS packet on a channel that overlaps (or is referred to as adjacent) the channel 6 with the 10 MHz frequency bandwidth. The following further describes this method.

In the conventional technology, a self-CTS packet is used to resolve a problem of mutual interference between a terminal device using the IEEE802.11g protocol and a terminal device using the IEEE802.11b protocol. In some application scenarios, both the terminal device using the IEEE802.11g protocol and the terminal device using the IEEE802.11b protocol exist in a WLAN network. Two terminal devices using different protocols use different physical layer modulation technologies. For example, the terminal device using the IEEE802.11b protocol uses a CCK modulation technology, and the terminal device using the IEEE802.11g protocol uses an ERP-OFDM modulation technology. Therefore, the two terminal devices using the different protocols cannot perceive data transmission of each other. In this case, data packets may collide on a channel, causing packet loss. To resolve this problem, the terminal device using the IEEE802.11g protocol sends a self-CTS packet on the channel before transmitting a data packet. The terminal device that uses the IEEE802.11b protocol and that receives the self-CTS packet keeps silent (that is, does not send data) within a channel occupancy time declared by the self-CTS packet, to avoid a problem that data packets of two terminal devices collide.

According to a mechanism and a physical layer principle of the Wi-Fi protocol, interference occurs if different Wi-Fi terminals transmit signals on a same channel or adjacent channels. The Wi-Fi protocol introduces a mechanism such as RTS/CTS/backoff algorithm/PCF to resolve the interference problem. However, the mechanism takes effect only on a same channel/bandwidth, and cannot resolve mutual interference between terminal devices across channels/with different bandwidths.

Figure 11:
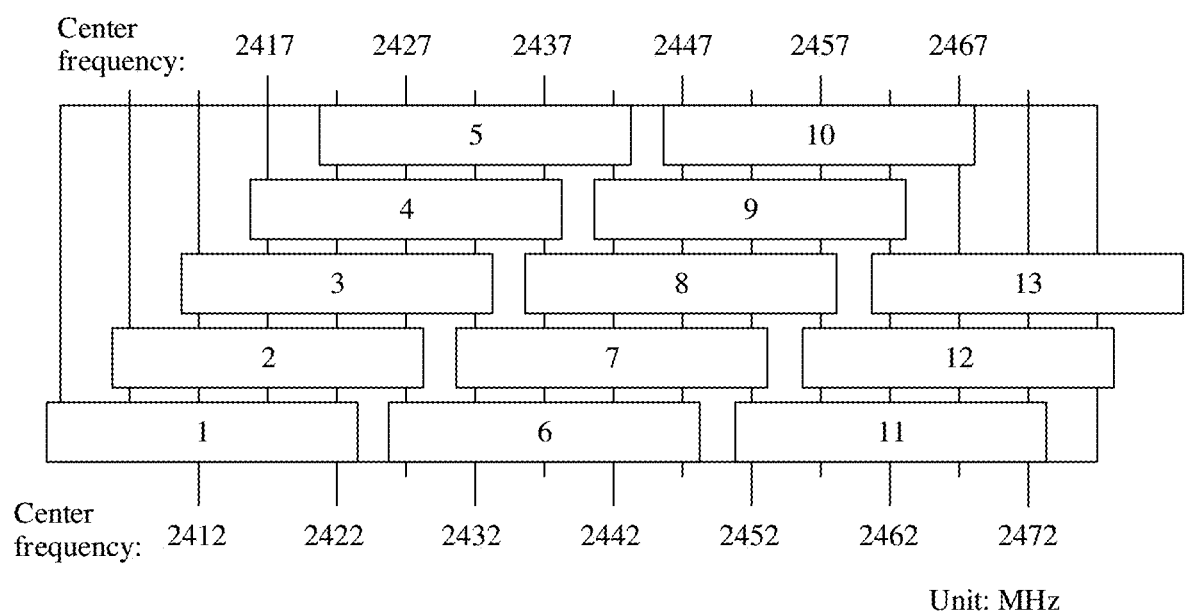
FIG. 11 is a schematic diagram of channel division according to an embodiment of this application.

FIG. 11 is a schematic diagram of channel division according to an embodiment of this application. Table 3 is a WLAN channel configuration table of a 2400 MHz frequency band.

TABLE 3

| Channel | Center frequency (MHz) | Channel low/high frequency |
| --- | --- | --- |
| 1 | 2412 | 2401/2423 |
| 2 | 2417 | 2406/2428 |
| 3 | 2422 | 2411/2433 |

TABLE 3-continued

| Channel | Center frequency (MHz) | Channel low/high frequency |
| --- | --- | --- |
| 4 | 2427 | 2416/2438 |
| 5 | 2432 | 2421/2443 |
| 6 | 2437 | 2426/2448 |
| 7 | 2442 | 2431/2453 |
| 8 | 2447 | 2436/2458 |
| 9 | 2452 | 2441/2463 |
| 10 | 2457 | 2446/2468 |
| 11 | 2462 | 2451/2473 |
| 12 | 2467 | 2456/2478 |
| 13 | 2472 | 2461/2483 |

Figure 12:
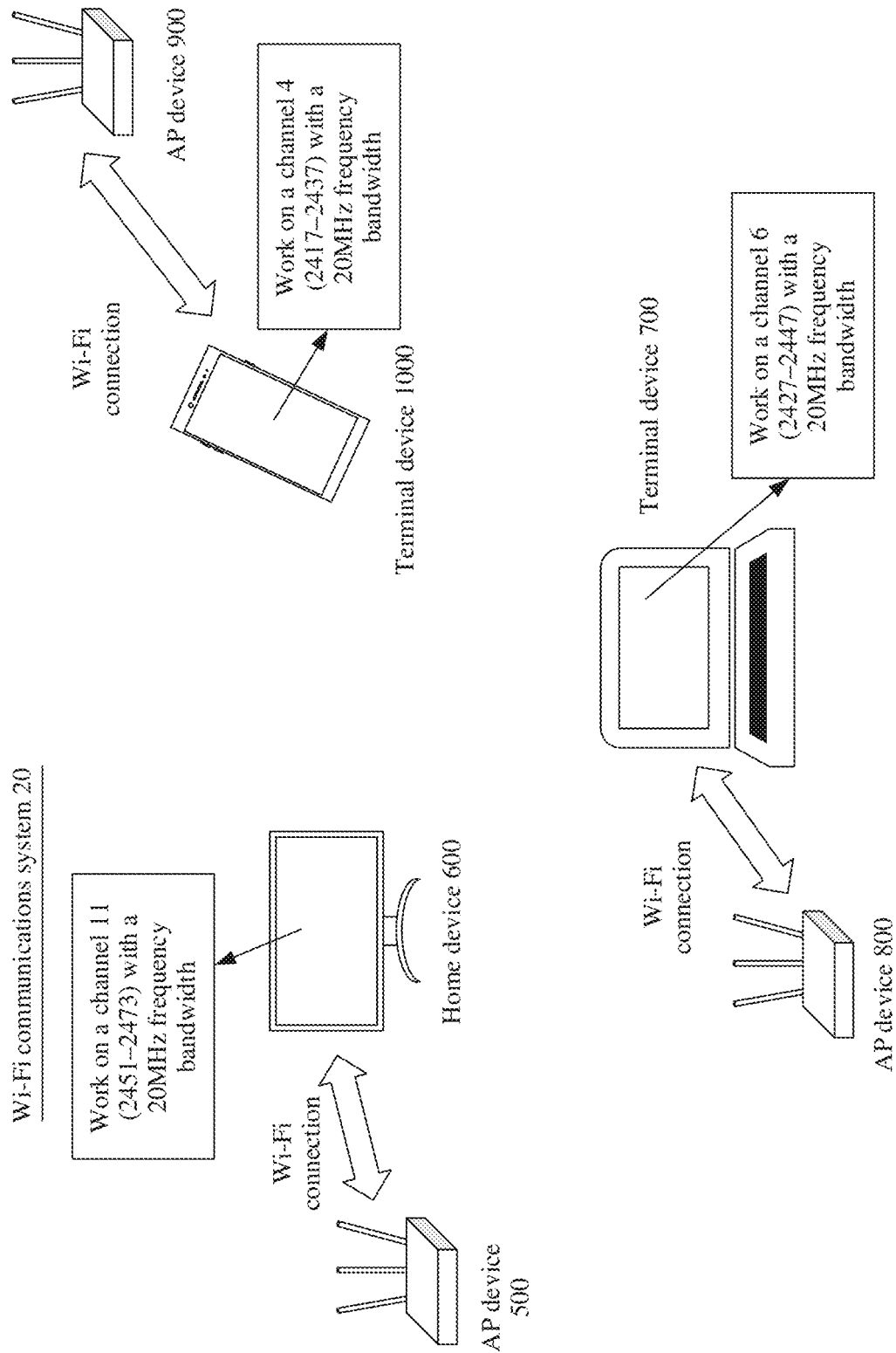
FIG. 12 is a schematic diagram of another communications system 20 according to an embodiment of this application.

With reference to FIG. 11 and Table 3, it can be learned that terminal devices on adjacent channels/channels with different frequency bandwidths may interfere with each other. For example, FIG. 12 is a schematic diagram of another communications system 20 according to an embodiment of this application. The communications system 20 includes an AP device 500, an AP device 800, an AP device 900, a home device 600, a terminal device 700, and a terminal device 1000. The AP device 500 provides a channel 11 (2451-2473) with a 20 MHz frequency bandwidth for the home device 600. The AP device 800 provides a channel 6 (2427-2447) with a 20 MHz frequency bandwidth for the terminal device 700. The AP device 900 provides a channel 4 (2417-2437) with a 20 MHz frequency bandwidth for the terminal device 1000. A frequency domain range of the channel 6 (2427-2447) with the 20 MHz frequency bandwidth overlaps a frequency domain range of the channel 4 (2417-2437) with the 20 MHz frequency bandwidth, and the terminal device 700 and the terminal device 1000 may interfere with each other. A frequency domain range of the channel 11 (2451-2473) with the 20 MHz frequency bandwidth does not overlap a frequency domain range of the channel 6 (2427-2447) with the 20 MHz frequency bandwidth or a frequency domain range of the channel 4 (2417-2437) with the 20 MHz frequency bandwidth, the home device 600 and the terminal device 1000 do not interfere with each other, and the home device 600 and the terminal device 700 do not interfere with each other.

To improve reliability of Wi-Fi P2P connection communication and avoid packet loss caused by a collision, the terminal device may further send, before switching to the channel 6 with the 10 MHz frequency bandwidth, a self-CTS packet on a channel that overlaps (or is referred to as adjacent) the channel 6 with the 10 MHz frequency bandwidth. The overlapped channel is a channel whose frequency range overlaps a frequency range of the channel 6 with the 10 MHz frequency bandwidth, for example, the channel 4 (2417-2437) with the 20 MHz frequency bandwidth.

In other words, before step S107 in the foregoing method, the terminal device may determine whether a channel that overlaps a channel (for example, the channel 6 with the 10 MHz frequency bandwidth) used for Wi-Fi P2P communication exists in an environment. When the terminal device determines that there is a channel that overlaps the channel 6 with the 10 MHz frequency bandwidth, the terminal device sends a self-CTS packet on the overlapped channel. The self-CTS packet is used to indicate a receiving device that receives the self-CTS packet to remain silent within a channel occupancy time declared by the self-CTS packet. Then, the terminal device performs step S107. When the terminal device determines that there is no channel that overlaps the channel 6 with the 10 MHz frequency bandwidth, the terminal device directly performs step S107.

In a possible implementation, the terminal device may scan and store AP information (for example, a channel and a frequency bandwidth) in an environment in a preset manner (for example, based on a preset periodicity), and determine, based on the stored AP information and the channel used for Wi-Fi P2P communication, whether an overlapping channel exists. For example, used channels obtained by the terminal device through scanning are: the channel 4 with the 20 MHz frequency bandwidth, the channel 6 with the 20 MHz frequency bandwidth, and a channel 36 with a 40M frequency bandwidth. The channel used for Wi-Fi P2P communication is the channel 6 with the 10 MHz frequency bandwidth. In this case, the determined overlapping channels are the channel 4 with the 20 MHz frequency bandwidth and the channel 6 with the 20 MHz frequency bandwidth.

Figure 13:
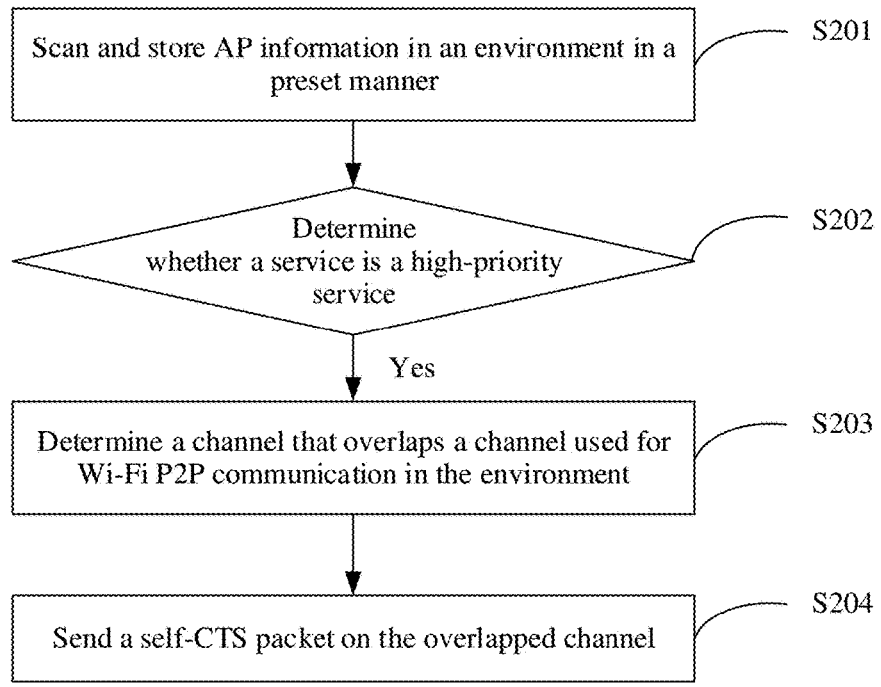
FIG. 13 is a flowchart of sending a self-CTS packet by a terminal device according to an embodiment of this application.

In some embodiments, before the terminal device determines the overlapped channel in the environment, the terminal device may determine whether a service (that is, a service that needs to be executed after the Wi-Fi P2P connection) is a high-priority service. If the service is a high-priority service, the terminal device confirms the overlapped channel. If the service is not a high-priority service, the terminal device does not perform the step of sending the self-CTS packet. The high-priority service may be preset. For example, the high-priority service may be a service that has a relatively high requirement on a delay or communication quality. For example, the high-priority service may be a synchronous audio/video playing service, an audio/video call service, or a game control service in a projection scenario. FIG. 13 is a flowchart of sending a self-CTS packet by a terminal device according to an embodiment of this application. In other words, for the foregoing procedure, refer to content of step S201 to step S204.

In some embodiments, the terminal device may send a self-CTS packet on all overlapped AP channels. In some other embodiments, the terminal device may send a self-CTS packet only on an overlapped AP channel that has been accessed by the terminal device. For the sake of information security, the terminal device may have no control permission on an AP channel that has not been accessed. If a self-CTS packet is sent on the AP channel that has not been accessed, a Wi-Fi network used by another user may be affected. In some other embodiments, the terminal device may prestore information about an AP channel that needs to be scanned. For example, a user may enter information about a plurality of AP channels in a home network into the terminal device. The terminal device may send a self-CTS packet on an overlapped AP channel whose information has been prestored.

Figure 14:
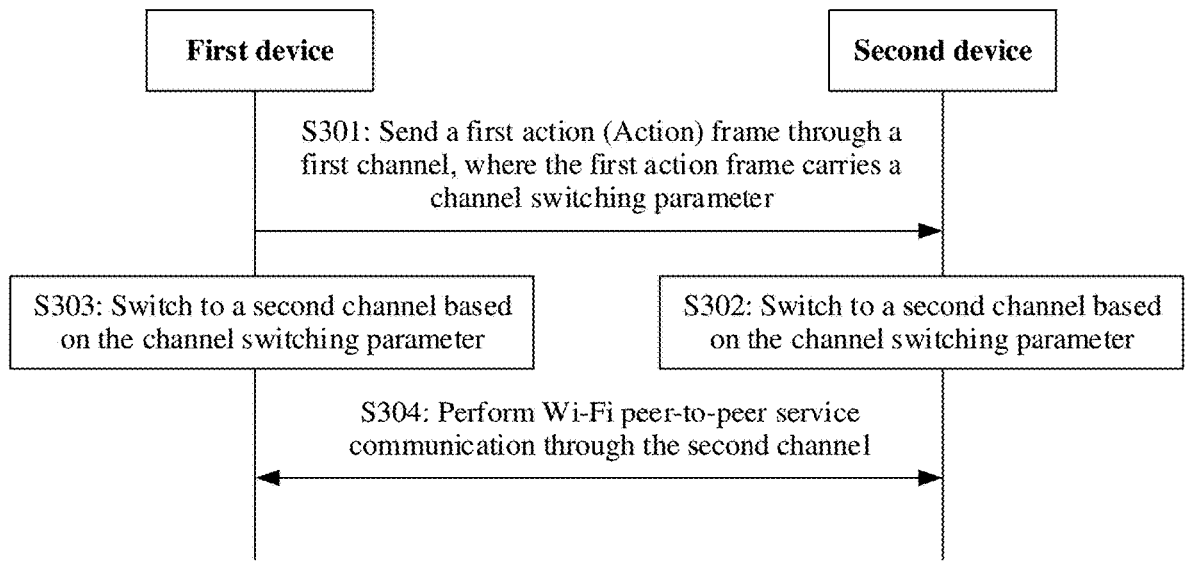
FIG. 14 is a flowchart of another method for implementing a Wi-Fi peer-to-peer service according to an embodiment of this application.

FIG. 14 is a flowchart of another method for implementing a Wi-Fi peer-to-peer service according to an embodiment of this application. The method may be applied to the Wi-Fi communications system shown in FIG. 1. The method includes the following steps.

S301: A first device sends a first action frame to a second device through a first channel.

The first action frame carries a channel switching parameter, and the channel switching parameter includes one or a combination of the following: channel information of a second channel, switching mode information, and dual band adaptive concurrent DBAC mode information. For example, refer to the description in the embodiment corresponding to FIG. 4. The first device may be the terminal device 100 in FIG. 1, the second device may be the home device 300 in FIG. 1, and the first channel may be the channel 1 with the 20 MHz frequency bandwidth. For example, for the first action frame, refer to the description in the content corresponding to FIG. 5.

S302: The second device receives the first action frame, and switches to the second channel based on the channel switching parameter.

For example, for the channel switching parameter, refer to the description in the content corresponding to Table 2. The second channel may be the channel 6 with the 10 MHz frequency bandwidth.

S303: The first device switches to the second channel based on the channel switching parameter.

S304: The first device performs Wi-Fi peer-to-peer service communication with the second device through the second channel.

For example, the Wi-Fi peer-to-peer service may be the service described in the embodiment corresponding to FIG. 4 in which the terminal device 100 controls the home device 300 (smart lamp) to perform color switching.

In a possible implementation, the Wi-Fi communications system further includes an access point AP, and the AP, the first device, and the second device communicate with each other through the first channel. For example, the AP may be the AP device 200 in FIG. 1. The AP device 200, the terminal device 100, and the home device 300 (smart lamp) may all communicate with each other through the channel 1 with the 20 MHz frequency bandwidth.

In a possible implementation, the channel switching parameter includes an immediate switching mode, and the immediate switching mode is used to indicate the second device to switch to the second channel in response to the first action frame. For example, for a manner of the immediate switching mode, refer to the description in the content corresponding to FIG. 7. The second channel may be the channel 6 with the 10 MHz frequency bandwidth.

In a possible implementation, the channel switching parameter includes a delayed switching mode and an extension time corresponding to the delayed switching mode, and the delayed switching mode and the extension time are used to indicate the second device to switch to the second channel after a delay of the extension time. For example, for a manner of the delayed switching mode, refer to the description in the content corresponding to FIG. 8. The second channel may be the channel 6 with the 10 MHz frequency bandwidth.

In a possible implementation, the channel switching parameter includes a permanent switching mode, and the permanent switching mode is used to indicate the second device to continuously listen to the second channel and the first channel. The method further includes: The first device sends a second action frame to the second device, where the second action frame is used to indicate the second device to switch back to the first channel. The second device receives the second action frame, and switches to the first channel based on the second action frame. For example, for a manner of the permanent switching mode, refer to the description in the content corresponding to FIG. 7. The second channel may be the channel 6 with the 10 MHz frequency bandwidth, and the first channel may be the channel 1 with the 20 MHz frequency bandwidth.

In a possible implementation, the channel switching parameter includes a fixed-duration switching mode and switching duration corresponding to the fixed-duration switching mode, and the fixed-duration switching mode and the switching duration are used to indicate the second device to switch back to the first channel after the switching duration starting from the switching to the second channel.

For example, for a manner of the fixed-duration switching mode, refer to the description in the content corresponding to FIG. 8. The second channel may be the channel 6 with the 10 MHz frequency bandwidth, and the first channel may be the channel 1 with the 20 MHz frequency bandwidth.

In a possible implementation, the channel switching parameter includes a DBAC slot allocation ratio and a scheduling periodicity, the DBAC slot allocation ratio is used to indicate a ratio of duration in which the second device listens to the first channel to duration in which the second device listens to the second channel in one scheduling periodicity, and the scheduling periodicity is used to indicate a sum of the duration for listening to the first channel and the duration for listening to the second channel that are consecutive. The method further includes: The second device listens to the first channel and the second channel based on the DBAC slot allocation ratio and the scheduling periodicity. For example, for a schematic diagram of listening to the first channel and the second channel by the second device, refer to FIG. 9. The DBAC slot allocation ratio is 7:3, and the scheduling periodicity is 100 ms.

In a possible implementation, the channel information of the second channel includes a channel identifier and a frequency bandwidth of the second channel, and the frequency bandwidth is less than 20 MHz. For example, the channel identifier of the second channel may be 6, and the frequency bandwidth of the second channel may be 10 MHz.

In a possible implementation, a manner in which a first device sends a first action frame to a second device through a first channel may be: The first device broadcasts the first action frame on the first channel. In a broadcast manner, the first action frame may be directly sent and received by all receiving devices on a channel sent by a terminal device, without waiting for RTS/CTS, so that efficiency of establishing Wi-Fi peer-to-peer service communication can be improved.

In a possible implementation, the channel switching parameter includes the channel identifier and the frequency bandwidth of the second channel, and the method further includes: The first device determines used communication channels in an environment in which the first device is currently located. The first device determines the channel identifier and the frequency bandwidth of the second channel based on the used communication channels, where there is no overlapping frequency band between the second channel and the used communication channels, or the second channel is an idlest channel in the used communication channels, or the second channel is a channel with best communication quality in the used communication channels. In this manner, communication quality of Wi-Fi peer-to-peer service communication can be improved.

In a possible implementation, the channel switching parameter includes the switching mode information and the DBAC mode information, the switching mode information includes a switching manner and/or switching duration for the second device to switch to the second channel, and the DBAC mode information includes the DBAC slot allocation ratio and/or the scheduling periodicity. The method further includes: The first device determines the switching mode information and the DBAC mode information based on a requirement of the Wi-Fi peer-to-peer service. In this manner, a communication requirement of the Wi-Fi peer-to-peer service can be met.

In a possible implementation, the first device prestores a key corresponding to the second device, and the first action frame is encrypted by using the key corresponding to the second device. In this manner, a problem that another receiving device performs a misoperation in response to the first action frame can be avoided.

In a possible implementation, after the second device receives the first action frame, the method further includes: The second device parses the first action frame based on the key corresponding to the second device, to determine the channel switching parameter. The second device sends an acknowledgement ACK to the first device, where the ACK is a response to the first action frame, and the ACK is used to indicate that the second device has successfully received and obtained the first action frame through parsing. The first device receives the ACK sent by the second device. That the first device switches to the second channel based on the channel switching parameter includes: The first device switches to the second channel based on the channel switching parameter and the ACK. In this manner, the first device can determine whether the second device successfully receives and obtains the first action frame through parsing, to improve reliability of implementing the Wi-Fi peer-to-peer service.

In a possible implementation, before the first device sends the first action frame to the second device through the first channel, the method further includes: The first device determines the used communication channels in the environment in which the first device is currently located. When the first device determines that there is a third channel, the first device sends a self-CTS packet through the third channel, where the third channel is one of the used communication channels, there is an overlapping frequency band between the third channel and the second channel, and the self-CTS packet is used to indicate a receiving device that receives the self-CTS packet to remain silent within a channel occupancy time declared by the self-CTS packet. For example, the first device may be the terminal device 100, the second channel may be the channel 6 with the 10 MHz frequency bandwidth, and the third channel may be the channel 4 with the 20 MHz frequency bandwidth. The terminal device 100 may send a self-CTS packet on the channel 4 with the 20 MHz frequency bandwidth before switching to the channel 6 with the 10 MHz frequency bandwidth. In this manner, communication quality of the Wi-Fi peer-to-peer service can be improved.

In a possible implementation, before the first device sends the self-CTS packet through the third channel, the method further includes: The first device determines that the Wi-Fi peer-to-peer service is a high-priority service. The high-priority service may be preset. For example, the high-priority service may be a service that has a relatively high requirement on a delay or communication quality. For example, the high-priority service may be a synchronous audio/video playing service, an audio/video call service, or a game control service in a projection scenario. Because sending of the self-CTS packet affects another communication service to be performed by the receiving device, the self-CTS packet may be selectively sent before a high-priority service is performed.

In a possible implementation, the first device stores historical information of APs that have been successfully accessed by the first device, and information about an AP that provides the third channel is included in the historical information. For the sake of information security, the terminal device may have no control permission on an AP channel that has not been accessed. If a self-CTS packet is sent on the AP channel that has not been accessed, a Wi-Fi network used by another user may be affected.

Another embodiment of this application provides a computer program product. The computer program product includes computer instructions, and when the computer instructions are run on a communications device, the communications device is enabled to perform the method performed by the first device described in the foregoing content.

Another embodiment of this application provides a computer program product. The computer program product includes computer instructions, and when the computer instructions are run on a communications device, the communications device is enabled to perform the method performed by the second device described in the foregoing content.

Another embodiment of this application provides a computer-readable storage medium. The computer-readable storage medium includes instructions, and when the instructions are run on a communications device, the communications device is enabled to perform the method performed by the first device described in the foregoing content.

Another embodiment of this application provides a computer-readable storage medium. The computer-readable storage medium includes instructions, and when the instructions are run on a communications device, the communications device is enabled to perform the method performed by the second device described in the foregoing content.

Another embodiment of this application provides a chip. The chip is applied to a communications device. The chip includes a processor, a memory, and a communications interface. The memory stores a computer program, and the processor is configured to execute the computer program to implement the method performed by the first device described in the foregoing content.

Another embodiment of this application provides a chip. The chip is applied to a communications device. The chip includes a processor, a memory, and a communications interface. The memory stores a computer program, and the processor is configured to execute the computer program to implement the method performed by the second device described in the foregoing content.

All or some of the foregoing embodiments may be implemented by using software, hardware, firmware, or any combination thereof. When software is used to implement the foregoing embodiments, all or some of the foregoing embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to a Wi-Fi communications system, the Wi-Fi communications system comprising a first device and a second device, and the method comprising:
sending, by the first device, a first action frame to the second device through a first channel, the first action frame indicating switching to a second channel, wherein the first action frame carries a channel switching parameter, and the channel switching parameter comprises one or a combination of following: channel information of the second channel, switching mode information, or dual band adaptive concurrent (DBAC) mode information, and wherein the first action frame is encrypted using a prestored key corresponding to the second device;
receiving, by the second device, the first action frame, parsing the first action frame based on the prestored key corresponding to the second device, to determine the channel switching parameter, and switching to the second channel based on the channel switching parameter comprised in the first action frame;
sending, by the second device, an acknowledgement (ACK) to the first device, wherein the ACK is a response to the first action frame, and the ACK indicates that the second device has successfully received and obtained the first action frame;
receiving, by the first device, the ACK sent by the second device;
switching, by the first device, to the second channel based on the channel switching parameter and the ACK; and
performing, by the first device, Wi-Fi peer-to-peer service communication with the second device through the second channel.

2. The method according to claim 1, wherein the Wi-Fi communications system further comprises an access point (AP), and the AP, the first device, and the second device communicate with each other through the first channel.

3. The method according to claim 1, wherein the channel switching parameter comprises an immediate switching mode, and the immediate switching mode indicates the second device to switch to the second channel in response to the first action frame.

4. The method according to claim 1, wherein the channel switching parameter comprises a delayed switching mode and an extension time corresponding to the delayed switching mode, and the delayed switching mode and the extension time indicate the second device to switch to the second channel after a delay of the extension time.

5. The method according to claim 1, wherein the channel switching parameter comprises a permanent switching mode, and the permanent switching mode indicates the second device to continuously listen to the second channel and the first channel; and
the method further comprises:
sending, by the first device, a second action frame to the second device through the second channel, wherein the second action frame indicates the second device to switch back to the first channel; and receiving, by the second device, the second action frame, and switching to the first channel based on the second action frame.

6. The method according to claim 1, wherein the channel switching parameter comprises a fixed-duration switching mode and switching duration corresponding to the fixed-duration switching mode, and the fixed-duration switching mode and the switching duration indicate the second device to switch back to the first channel after the switching duration starting from the second device switching to the second channel.

7. The method according to claim 1, wherein the channel switching parameter comprises a DBAC slot allocation ratio and a scheduling periodicity, the DBAC slot allocation ratio indicates a ratio of first duration in which the second device listens to the first channel to second duration in which the second device listens to the second channel in the scheduling periodicity, and the scheduling periodicity indicates a sum of the first duration and the second duration that are consecutive; and the method further comprises:
listening to, by the second device, the first channel and the second channel based on the DBAC slot allocation ratio and the scheduling periodicity.

8. The method according to claim 1, wherein the channel information of the second channel comprises a channel identifier and a frequency bandwidth of the second channel, and the frequency bandwidth is less than 20 MHz.

9. The method according to claim 1, wherein sending, by the first device, the first action frame to the second device through the first channel comprises:
broadcasting, by the first device, the first action frame on the first channel.

10. The method according to claim 1, wherein the channel switching parameter comprises a channel identifier and a frequency bandwidth of the second channel, and the method further comprises:
determining, by the first device, used communication channels in an environment in which the first device is currently located; and
determining, by the first device, the channel identifier and the frequency bandwidth of the second channel based on the used communication channels, wherein there is no overlapping frequency band between the second channel and the used communication channels.

11. The method according to claim 1, wherein the channel switching parameter comprises a channel identifier and a frequency bandwidth of the second channel, and the method further comprises:
determining, by the first device, used communication channels in an environment in which the first device is currently located; and
determining, by the first device, the channel identifier and the frequency bandwidth of the second channel based on the used communication channels, wherein the second channel is a least loaded channel in the used communication channels.

12. The method according to claim 1, wherein the channel switching parameter comprises a channel identifier and a frequency bandwidth of the second channel, and the method further comprises:
determining, by the first device, used communication channels in an environment in which the first device is currently located; and
determining, by the first device, the channel identifier and the frequency bandwidth of the second channel based on the used communication channels, wherein the second channel is a channel with best communication quality in the used communication channels.

13. The method according to claim 1, wherein the channel switching parameter comprises the switching mode information and the DBAC mode information, the switching mode information comprises a switching manner or switching duration for the second device to switch to the second channel, and the DBAC mode information comprises a DBAC slot allocation ratio or a scheduling periodicity, the DBAC slot allocation ratio indicating a ratio of first duration in which the second device listens to the first channel to second duration in which the second device listens to the second channel in the scheduling periodicity; and the method further comprises:
determining, by the first device, the switching mode information and the DBAC mode information based on a requirement of a Wi-Fi peer-to-peer service.

14. The method according to claim 1, wherein before sending, by the first device, the first action frame to the second device through the first channel, the method further comprises:
determining, by the first device, used communication channels in an environment in which the first device is currently located; and
when the first device determines that there is a third channel in the used communication channels, sending, by the first device, a self-clear to send (CTS) packet through the third channel, the third channel and the second channel having an overlapping frequency band, and the self-CTS packet indicating a receiving device that receives the self-CTS packet to remain silent within a channel occupancy time declared by the self-CTS packet.

15. The method according to claim 14, wherein before sending, by the first device, the self-CTS packet through the third channel, the method further comprises:
determining, by the first device, that a Wi-Fi peer-to-peer service implemented by the method is a high-priority service.

16. The method according to claim 14, wherein the first device stores historical information of access points (APs) that have been successfully accessed by the first device, and information about an AP that provides the third channel is comprised in the historical information.

17. A method comprising:
receiving, by a second device through a first channel, a first action frame sent by a first device, the first action frame indicating switching to a second channel, wherein the first action frame carries a channel switching parameter, and the channel switching parameter comprises one or a combination of following: channel information of the second channel, switching mode information, or dual band adaptive concurrent (DBAC) mode information, and the first action frame is encrypted using a key corresponding to the second device that is prestored in the first device before the first action frame is encrypted;
parsing, by the second device, the first action frame based on the key corresponding to the second device, to determine the channel switching parameter;
sending, by the second device, an acknowledgement (ACK) to the first device, wherein the ACK is a response to the first action frame, and the ACK indicates that the second device has successfully received and obtained the first action frame;
switching, by the second device, to the second channel based on the channel switching parameter; and performing, by the second device, Wi-Fi peer-to-peer service communication with the first device through the second channel.

18. A communications device, wherein the communications device comprises one or more processors and a non-transitory memory, the memory is coupled to the one or more processors, the memory stores a program code, and the one or more processors invoke the program code to cause the communications device to perform following operations:

receiving, through a first channel, a first action frame sent by a first device, the first action frame indicating switching to a second channel, wherein the first action frame carries a channel switching parameter, and the channel switching parameter comprises one or a combination of following: channel information of the second channel, switching mode information, or dual band adaptive concurrent (DBAC) mode information, and the first action frame is encrypted using a key corresponding to the communications device that is pre-stored in the first device before the first action frame is encrypted;

parsing the first action frame based on the key corresponding to the communication device, to determine the channel switching parameter;

sending an acknowledgement (ACK) to the first device, wherein the ACK is a response to the first action frame, and the ACK indicates that the communications device has successfully received and obtained the first action frame;

switching to the second channel based on the channel switching parameter; and performing Wi-Fi peer-to-peer service communication with the first device through the second channel.

* * * * *